United States Patent [19]

Lipscomb et al.

[11] Patent Number: 5,516,468
[45] Date of Patent: May 14, 1996

[54] METHOD FOR THE PRODUCTION OF PLASTIC LENSES

[75] Inventors: N. Thornton Lipscomb; Omar M. Buazza; Stephen C. Luetke, all of Louisville, Ky.; John J. Robinson, Cincinnati, Ohio

[73] Assignee: Q2100, Inc., Louisville, Ky.

[21] Appl. No.: 339,457

[22] Filed: Nov. 14, 1994

Related U.S. Application Data

[62] Division of Ser. No. 180,836, Jan. 13, 1994, Pat. No. 5,364,256, which is a continuation of Ser. No. 642,614, Jan. 17, 1991, abandoned, which is a continuation-in-part of Ser. No. 425,371, Oct. 26, 1989, abandoned, which is a continuation-in-part of Ser. No. 273,428, Nov. 18, 1988, Pat. No. 4,879,318, which is a continuation-in-part of Ser. No. 21,913, Mar. 4, 1987, abandoned, which is a continuation-in-part of Ser. No. 823,339, Jan. 28, 1986, Pat. No. 4,728,469.

[51] Int. Cl.$^6$ ..................................................... B29D 11/00
[52] U.S. Cl. ........................................... 264/1.38; 264/348
[58] Field of Search .............................. 264/1.1, 22, 1.38, 264/237, 348, 1.36; 425/174.4, 808

[56] References Cited

U.S. PATENT DOCUMENTS

| | | |
|---|---|---|
| 2,370,565 | 2/1945 | Muskat et al. . |
| 2,370,567 | 2/1945 | Muskat et al. . |

(List continued on next page.)

FOREIGN PATENT DOCUMENTS

| | | |
|---|---|---|
| 1244593 | 11/1988 | Canada . |
| 0207640 | 1/1987 | European Pat. Off. . |
| 0226123 | 6/1987 | European Pat. Off. . |
| 0224123 | 6/1987 | European Pat. Off. . |
| 0299628 | 1/1989 | European Pat. Off. . |
| 0322353 | 6/1989 | European Pat. Off. . |
| 0439394A2 | 7/1991 | European Pat. Off. . |
| 2551223 | 8/1984 | France . |
| 3715412A1 | 11/1992 | Germany . |
| 55-132221 | 10/1980 | Japan . |
| 39-17442 | 8/1984 | Japan . |
| 59-86603 | 8/1984 | Japan . |
| 60-245607 | 12/1985 | Japan . |
| 62-288030 | 12/1987 | Japan . |
| 3-184001 | 8/1991 | Japan . |
| 2082107 | 3/1982 | United Kingdom . |
| 2155940 | 10/1985 | United Kingdom . |
| WO89/11966 | 12/1989 | WIPO . |
| 90/13413 | 11/1990 | WIPO . |
| WO92/12851 | 8/1992 | WIPO . |

OTHER PUBLICATIONS

International Search Report dated Mar. 2, 1990.
Examiner's First Report on Canadian Patent Application 46219/89 dated Jul. 31, 1991.
Brochure from PPG Industries–HIRI Casting Resin "The New HIRI High–Index Casting Resin from PPG".
Leaflet from PPG Industries–CR–39 Monomer.
Brochure from Goldenwest Mfg. Inc.—Fast Cast–FC "Brings New Ideas to Life in Less Than 15 Minutes".
Article from *Et Ultra* "The Peptide Connection" Winter–Spring 1989.
"Kinetics and Mechanism of the Benzoin Isobutyl Ether Photoinitiated Polymerization of Styrene" Lipscomb et al. *Journal of Polymer Science:* Part A: *Polymer Chemistry*, vol. 26, 529–540 (1988).
Chapter 10. Diallyl Carbonates, pp. 301–325.
"A Comparison of Photoinitiator Efficiency in the Polymerization of Diethylene Glycol bis(Allyl Carbonate)" by Lipscomb et al.

(List continued on next page.)

*Primary Examiner*—Mathieu D. Vargot
*Attorney, Agent, or Firm*—Conley, Rose & Tayon

[57] ABSTRACT

The method includes disposing a liquid monomer or a monomer mixture and a photosensitive initiator into a mold cavity defined by mold members and directing ultraviolet light to act on the lens forming material in the cavity to produce a lens therefrom. The mold members are cooled by air.

37 Claims, 6 Drawing Sheets

U.S. PATENT DOCUMENTS

| | | |
|---|---|---|
| 2,379,218 | 6/1945 | Dial et al. . |
| 2,384,115 | 9/1945 | Muskat et al. . |
| 2,403,112 | 7/1946 | Muskat . |
| 2,403,113 | 7/1946 | Muskat et al. . |
| 2,455,652 | 12/1948 | Bralley et al. . |
| 2,455,653 | 12/1948 | Bralley et al. . |
| 2,479,522 | 8/1949 | Strain . |
| 2,524,862 | 10/1950 | White . |
| 2,525,664 | 10/1950 | Gadsby et al. . |
| 2,529,866 | 11/1950 | Carlson . |
| 2,529,867 | 11/1950 | Carlson . |
| 2,542,386 | 2/1951 | Beattie . |
| 2,542,827 | 2/1951 | Minter . |
| 2,547,696 | 4/1951 | Foster . |
| 2,548,141 | 4/1951 | Bralley . |
| 2,568,658 | 9/1951 | Pope . |
| 2,587,437 | 2/1952 | Bralley et al. . |
| 2,587,442 | 2/1952 | Carlson . |
| 3,038,210 | 6/1962 | Hungerford et al. . |
| 3,210,297 | 10/1965 | Fischer et al. . |
| 3,222,432 | 12/1965 | Grandperret . |
| 3,248,460 | 4/1966 | Naujokas . |
| 3,278,654 | 10/1966 | Grandperret . |
| 3,306,723 | 2/1967 | Forber . |
| 3,364,525 | 1/1968 | Davy et al. . |
| 3,422,168 | 1/1969 | Bowser . |
| 3,423,488 | 1/1969 | Bowser . |
| 3,469,254 | 2/1970 | Wichterle . |
| 3,497,577 | 2/1970 | Wichterle . |
| 3,503,942 | 3/1970 | Seiderman . |
| 3,551,235 | 12/1970 | Bassemir . |
| 3,557,249 | 1/1971 | Dannels et al. . |
| 3,605,195 | 9/1971 | Campbell . |
| 3,660,545 | 5/1972 | Wichterle . |
| 3,720,827 | 3/1973 | Hemphill . |
| 3,745,042 | 7/1973 | Lim et al. . |
| 3,779,995 | 12/1973 | Dannels et al. . |
| 3,806,079 | 4/1974 | Beattie . |
| 3,808,178 | 4/1974 | Gaylord . |
| 3,872,042 | 3/1975 | Bond . |
| 3,915,609 | 10/1975 | Robinson . |
| 3,916,033 | 10/1975 | Merrill . |
| 3,938,775 | 2/1976 | Sarofeen . |
| 3,953,115 | 4/1976 | French et al. . |
| 3,970,417 | 7/1976 | Page . |
| 3,971,872 | 7/1976 | LeBoeuf . |
| 3,991,234 | 11/1976 | Chang et al. . |
| 4,022,855 | 5/1977 | Hamblen . |
| 4,031,163 | 6/1977 | Vollkommer et al. . |
| 4,064,308 | 12/1977 | Laurin . |
| 4,069,168 | 1/1978 | Leatherman et al. . |
| 4,071,424 | 1/1978 | Dart et al. . |
| 4,091,050 | 5/1978 | McDonald . |
| 4,095,772 | 6/1978 | Weber . |
| 4,113,224 | 9/1978 | Clark et al. . |
| 4,120,570 | 10/1978 | Gaylord . |
| 4,126,527 | 11/1978 | Kaufman . |
| 4,127,697 | 11/1978 | Laurin . |
| 4,132,518 | 1/1979 | Rips . |
| 4,138,538 | 2/1979 | Kaetsu et al. . |
| 4,139,578 | 2/1979 | Baughman et al. . |
| 4,139,692 | 2/1979 | Tanaka et al. . |
| 4,144,262 | 3/1979 | Stevens . |
| 4,146,696 | 3/1979 | Bond et al. . |
| 4,152,508 | 5/1979 | Ellis et al. . |
| 4,166,088 | 8/1979 | Neefe . |
| 4,181,627 | 1/1980 | Weiher et al. . |
| 4,191,717 | 3/1980 | Weber . |
| 4,191,804 | 3/1980 | Weber . |
| 4,197,266 | 4/1980 | Clark et al. . |
| 4,202,226 | 5/1980 | Becker et al. . |
| 4,205,154 | 5/1980 | Stevens . |
| 4,217,433 | 8/1980 | Dyball . |
| 4,227,950 | 10/1980 | Spycher . |
| 4,246,207 | 1/1981 | Spycher . |
| 4,251,474 | 2/1981 | Blandin . |
| 4,252,753 | 2/1981 | Rips . |
| 4,257,988 | 3/1981 | Matos et al. . |
| 4,260,564 | 4/1981 | Baiocchi et al. . |
| 4,298,005 | 11/1981 | Mutzhas . |
| 4,306,780 | 12/1981 | Tarumi et al. . |
| 4,308,400 | 12/1981 | Felder et al. . |
| 4,310,642 | 1/1982 | Margotte et al. . |
| 4,311,762 | 1/1982 | Spycher et al. . |
| 4,313,355 | 2/1982 | Becker et al. . |
| 4,342,863 | 8/1982 | Hohokabe et al. . |
| 4,345,546 | 8/1982 | Weber . |
| 4,346,197 | 8/1982 | Crano et al. . |
| 4,347,302 | 8/1982 | Gotman . |
| 4,360,637 | 11/1982 | Schwarz . |
| 4,369,298 | 1/1983 | Kida et al. . |
| 4,376,800 | 3/1983 | Lu et al. . |
| 4,378,250 | 3/1983 | Treadway et al. . |
| 4,382,902 | 5/1983 | Feurer . |
| 4,390,482 | 6/1983 | Feurer . |
| 4,408,016 | 10/1983 | Eads et al. . |
| 4,416,837 | 11/1983 | Neefe . |
| 4,417,790 | 11/1983 | Dawson et al. . |
| 4,432,832 | 2/1984 | Fantone . |
| 4,440,699 | 4/1984 | Smid et al. . |
| 4,440,909 | 3/1984 | Crano et al. . |
| 4,447,468 | 5/1984 | Keable . |
| 4,455,322 | 6/1984 | Weber . |
| 4,487,904 | 12/1984 | Fukuda et al. . |
| 4,490,495 | 12/1984 | Weber . |
| 4,497,754 | 2/1985 | Padoan . |
| 4,506,951 | 3/1985 | Yamada . |
| 4,512,340 | 4/1985 | Buck . |
| 4,522,768 | 6/1985 | Roscrow et al. . |
| 4,528,351 | 7/1985 | Tarumi et al. . |
| 4,534,915 | 8/1985 | Neefe . |
| 4,536,267 | 8/1985 | Ito et al. . |
| 4,537,732 | 8/1985 | Ueda et al. . |
| 4,542,201 | 9/1985 | Kanemura et al. . |
| 4,543,146 | 9/1985 | Petcen . |
| 4,544,572 | 10/1985 | Sandvig et al. . |
| 4,547,397 | 10/1985 | Burzynski et al. . |
| 4,551,361 | 11/1985 | Burzynski et al. . |
| 4,556,605 | 12/1985 | Mogami et al. . |
| 4,561,951 | 12/1985 | Neckers . |
| 4,589,231 | 5/1986 | Roberts . |
| 4,590,248 | 5/1986 | Moriya et al. . |
| 4,594,288 | 6/1986 | Dobigny et al. . |
| 4,607,087 | 8/1986 | Moriya et al. . |
| 4,609,267 | 9/1986 | Deguchi et al. . |
| 4,613,656 | 9/1986 | Tang . |
| 4,620,954 | 11/1986 | Singer et al. . |
| 4,622,376 | 11/1986 | Misura et al. . |
| 4,623,708 | 11/1986 | Ezrielev et al. . |
| 4,632,773 | 12/1986 | Neefe . |
| 4,636,212 | 1/1987 | Posin et al. . |
| 4,637,698 | 1/1987 | Kwak et al. . |
| 4,640,805 | 2/1987 | Neefe . |
| 4,643,537 | 2/1987 | Vance . |
| 4,655,005 | 4/1987 | Roberts . |
| 4,663,183 | 5/1987 | Ovshinsky et al. . |
| 4,666,976 | 5/1987 | Misura . |
| 4,668,751 | 6/1987 | Nakamoto et al. . |
| 4,686,266 | 8/1987 | Tang . |
| 4,693,446 | 9/1987 | Orlosky . |
| 4,695,399 | 9/1987 | Neefe . |
| 4,701,288 | 10/1987 | Cook et al. . |

| | | |
|---|---|---|
| 4,702,574 | 10/1987 | Bawa . |
| 4,721,377 | 1/1988 | Fukuda et al. . |
| 4,728,469 | 3/1988 | Danner et al. . |
| 4,732,715 | 3/1988 | Bawa et al. . |
| 4,737,447 | 4/1988 | Suzuki et al. . |
| 4,742,133 | 5/1988 | Tang et al. . |
| 4,745,168 | 5/1988 | Nakamoto et al. . |
| 4,746,716 | 5/1988 | Oates . |
| 4,756,972 | 7/1988 | Kloosterboer et al. . |
| 4,757,129 | 7/1988 | Oates . |
| 4,758,448 | 7/1988 | Sandvig et al. . |
| 4,774,035 | 9/1988 | Carmelite et al. . |
| 4,774,282 | 9/1988 | Quershi . |
| 4,775,733 | 10/1988 | Kanemura et al. . |
| 4,783,361 | 11/1988 | Ovshinsky et al. . |
| 4,789,318 | 12/1988 | Ehritt . |
| 4,791,185 | 12/1988 | Kanemura et al. . |
| 4,792,224 | 12/1988 | Kwiatkowski et al. . |
| 4,795,461 | 1/1989 | Lindqvist et al. . |
| 4,800,123 | 1/1989 | Boeckeler . |
| 4,801,667 | 1/1989 | Brand . |
| 4,803,254 | 2/1989 | Dunks et al. . |
| 4,808,652 | 2/1989 | Gardner . |
| 4,812,032 | 3/1989 | Fukuda et al. . |
| 4,812,598 | 3/1989 | Chen . |
| 4,816,584 | 3/1989 | Kwak et al. . |
| 4,820,747 | 3/1989 | Chen . |
| 4,822,864 | 3/1989 | Chen . |
| 4,829,136 | 5/1989 | Oates . |
| 4,836,960 | 6/1989 | Spector et al. . |
| 4,837,289 | 6/1989 | Mueller et al. . |
| 4,839,109 | 6/1989 | Kaetsu et al. . |
| 4,842,782 | 6/1989 | Portney et al. . |
| 4,846,913 | 7/1989 | Frieder et al. . |
| 4,861,823 | 3/1989 | Qureshi . |
| 4,871,821 | 11/1989 | Stenzenberger et al. . |
| 4,873,029 | 10/1989 | Blum . |
| 4,874,561 | 10/1989 | Spector . |
| 4,874,828 | 10/1989 | Lukacs . |
| 4,879,318 | 11/1989 | Lipscomb et al. . |
| 4,880,667 | 11/1989 | Welch . |
| 4,892,403 | 1/1990 | Merle . |
| 4,902,725 | 2/1990 | Moore . |
| 4,904,525 | 2/1990 | Taniguchi et al. . |
| 4,911,538 | 3/1990 | Robb . |
| 4,912,185 | 3/1990 | Toh . |
| 4,919,850 | 4/1990 | Blum et al. . |
| 4,929,707 | 5/1990 | Nagata et al. . |
| 4,931,220 | 6/1990 | Haynes et al. . |
| 4,931,523 | 6/1990 | Watanabe et al. . |
| 4,946,923 | 8/1990 | Nagata et al. . |
| 4,948,447 | 8/1990 | Clarke et al. . |
| 4,950,041 | 8/1990 | Robb . |
| 4,959,429 | 9/1990 | Misura et al. . |
| 4,963,995 | 6/1990 | Kwiatkowski . |
| 4,988,274 | 1/1991 | Kenmochi . |

OTHER PUBLICATIONS

Supplementary Partial European Search Report Dated Oct. 16, 1991; European Patent application 0 346 996 dated Dec. 12, 1989 to Renzi entitled "Process for Preparing Organic Glasses".

Dissertation Submitted to the Faculty of the Graduate School of The University of Louisville in Partial Fulfillment of the Requirements for the Degree of Doctor of Philoscophy entitled "UV–Photoiniated Polymerization of Styrene and Diethylene Glycol Bis(Allyl Carbonate) by Aromatic Carbonyl Compounds" by Omar M. Buazza dated Dec. 1987.

Examiner's First Report on Australian Patent Application 46219/89.

Articles from Vision Monday dated Jan. 7, 1991 p. 20 entitled "25–Minute Lens–Molding System Bows; and 20/20 dated Feb. 1991 p. 18 entitled 25–Minute Lens–Molding System Debuts".

Tenser, Article from *Vision Monday* dated Oct. 22, 1990 entitled "Vision Sciences Re–Casts Service Image".

Algrezza, Article from *Eyecare Business* dated Nov. 1990, pp. 28–30, entitled "Liquid Gold or Snake Oil?".

International Search Report on International Application No. PCT/US92/00327.

Patent Abstracts of Japan, vol. M–700, 12171, May 21, 1988.

International Search Report on International Application No. PCT/US92/00327, mailed Nov. 4, 1992.

Patent Abstracts of Japan, PN JP3184001, Aug. 12, 1991.

Annex to the International Search Report on International Patent Application No. 92/00327.

Preliminary International Search Report from European Branch of PCT ISA.

Abstract No. J03116003.

JP Abstract 58042436 to Matsushita Denki Sangyo (Patent Abstracts of Japan), vol. 7, No. 124 (M218) May 28, 1983).

Roffey, "Photopolymerization of Surface Coatings" John Wiley & Sons, p. 163, 1982.

Patent Abstracts of Japan, Application No. 88–310754, Mar. 17, 1987.

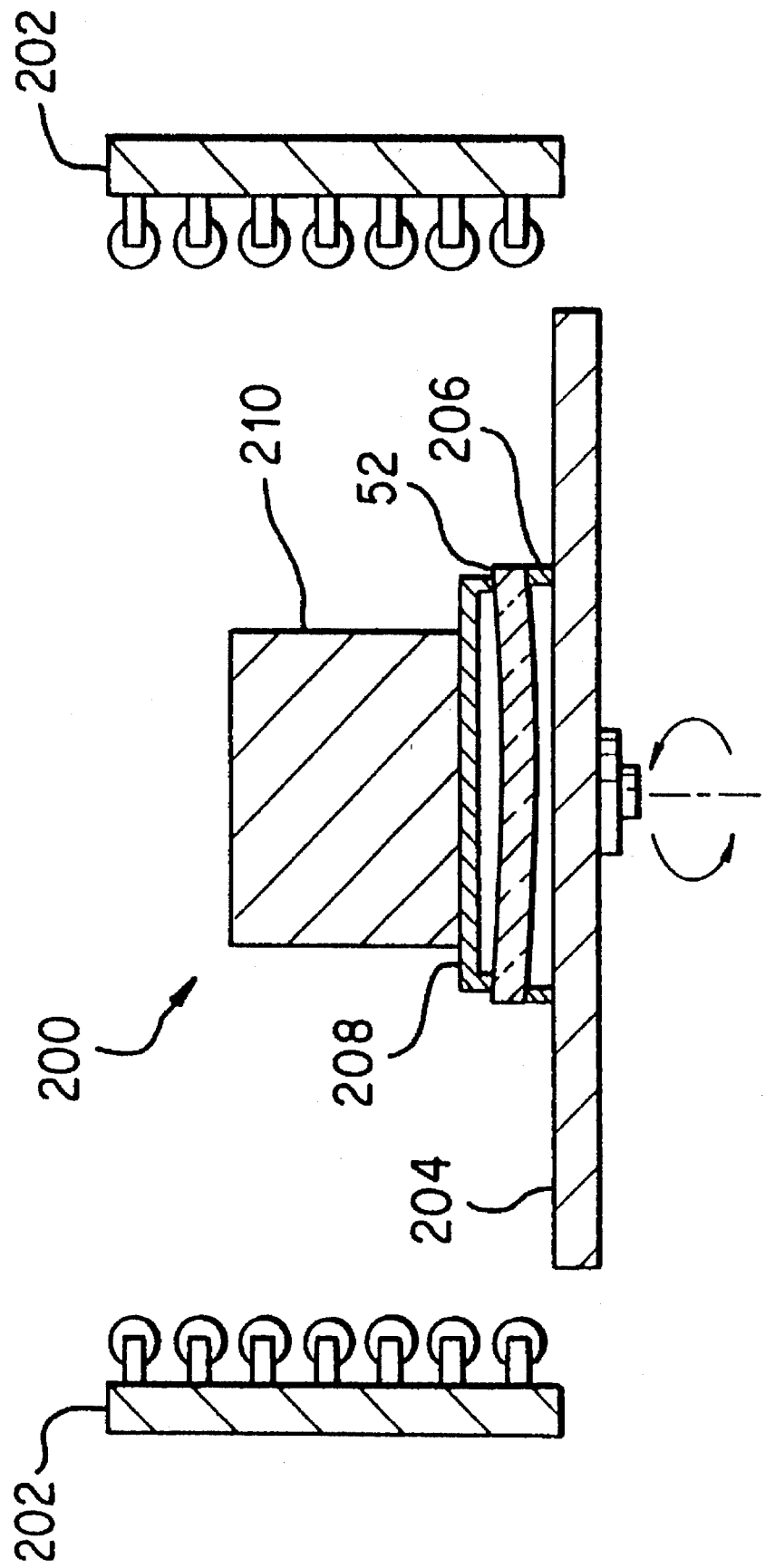

METHOD FOR THE PRODUCTION OF PLASTIC LENSES

CROSS-REFERENCE TO RELATED PATENT APPLICATIONS

This application is a division of application Ser. No. 08/180,836 filed Jan. 13, 1994, now U.S. Pat. No. 5,364,256, which is continuation of application Ser. No. 07/642,614 filed Jan. 17, 1991, now abandoned, which is a continuation-in part of Ser. No. 425,371 filed Oct. 26, 1989, now abandoned, which is a continuation-in-part of Ser. No. 273,428 filed Nov. 18, 1988, now U.S. Pat. No. 4,879,318, which is a continuation-in-part of Ser. No. 021,913 filed Mar. 4, 1987, now abandoned, which is a continuation-in-part of Ser. No. 823,339, filed Jan. 28, 1986 now U.S. Pat. No. 4,728,469. The disclosures of Ser. Nos. 425,371; 273, 428; 021,913; and 823,339 are specifically incorporated herein by reference.

BACKGROUND OF THE INVENTION

The present invention relates generally to methods, apparatus and compositions for making plastic lenses.

It is conventional in the art to produce optical lenses by thermal curing techniques from the polymer of diethylene glycol bis(allyl)-carbonate (DEG-BAC).

The polymer of DEG-BAC exhibits desirable optical and mechanical properties. These properties include high light transmission, high clarity, and high index of refraction together with high abrasion and impact resistance. These properties in the past made DEG-BAC one of the leading monomers in the manufacture of high quality lenses, face shields, sun and safety glasses. Other properties of DEG-BAC, however, such as its slow rate of polymerization make it an undesirable monomer in the manufacture of these items. Moreover, DEG-BAC, without any additives or comonomers produces a very hard but somewhat brittle polymer that is very prone to cracking. In addition, DEG-BAC, without additives adheres very tightly to the lens forming molds, often leading to cracking of the molds.

In addition, the thermal curing techniques for polymerizing DEG-BAC to produce optical lenses have several disadvantages and drawbacks. One of the most significant drawbacks is that it may take approximately 12 hours to produce a lens according to thermal curing techniques. A lens forming mold, therefore, can produce at most two lenses per day.

Moreover, thermal curing techniques employ a thermal catalyst so that a polymerizable mixture of DEG-BAC and catalyst will slowly polymerize even while refrigerated. The polymerizable mixture therefore has a very short shelf life and must be used within a short time or it will harden in its container.

Furthermore, the thermal catalysts utilized according to the thermal curing techniques are quite volatile and dangerous to work with requiring extreme care in handling.

U.S. Pat. Nos. 3,038,210 and 3,222,432 disclose methods for producing lenses by thermal curing techniques.

Optical lenses have also been produced by photocuring techniques. For example, U.S. Pat. No. 4,166,088 discloses a method for producing a plastic lens by directing rays of ultraviolet light against a mold having a lens forming material disposed in a cavity within the mold.

U.S. Pat. No. 4,298,005 discloses an apparatus for generating ultraviolet light having a wavelength in the range of 320 to 450 nm for hardening plastics.

In general, photochemical and thermal curing systems are analogous except that light instead of heat is the main driving force for the polymerization reaction. Curing of a lens by ultraviolet light, however, presents certain problems that must be overcome to produce a viable lens. Such problems include yellowing of the lens, cracking of the lens or mold, optical distortions in the lens and premature release of the lens from the mold.

The present invention is directed to methods, apparatus and compositions for making plastic lenses that overcome the disadvantages and drawbacks of the prior art.

SUMMARY OF THE INVENTION

The present invention provides methods, apparatus and compositions for making plastic lenses, such as optical lenses for use in eyeglasses and the like.

In one embodiment of the present invention, a method for making plastic lenses is provided in which a polymerizable lens forming material is disposed in a mold cavity defined in part between a first mold member and a second mold member spaced apart from each other by gasket means. Rays of substantially evenly distributed ultraviolet light are directed against either or both of the first and second mold members or the gasket means. In a preferred embodiment, the first and second mold members are cooled. In another preferred embodiment, the ultraviolet light is filtered before it impinges on either or both of the first and second mold members.

In another embodiment of the present invention, apparatus is provided for making plastic lenses which includes a first mold member and a second mold member spaced apart by gasket means, wherein the first and second mold members define a mold cavity. The apparatus includes means for generating and directing ultraviolet light against at least one of the first and second mold members. Alternatively, the apparatus includes means for generating and directing ultraviolet light against the gasket means and means for preventing the transmission of ultraviolet light through the first and second mold members. In addition, the apparatus includes filter means for filtering the ultraviolet light which filter means are disposed between the means for generating and directing ultraviolet light and the first mold member and between the means for generating and directing ultraviolet light and the second mold member. Finally, the apparatus includes air distribution means or a liquid bath for cooling the first and second mold members.

In still another embodiment of the present invention, a polymerizable lens forming composition is provided which includes a monomer mixture of bisphenol A(bisallylcarbonate), 1,6 hexanediol dimethacrylate, trimethylolpropane triacrylate, tetraethylene glycol diacrylate and tripropylene glycol diacrylate. In a preferred embodiment, the composition includes a photoinitiator selected from 1-hydroxycyclohexyl phenyl ketone and methyl benzoylformate or a mixture thereof. In another preferred embodiment, the composition includes a blue dye.

BRIEF DESCRIPTION OF THE DRAWINGS

The above brief description as well as further objects, features and advantages of the methods, apparatus and compositions of the present invention will be more fully appreciated by reference to the following detailed descrip

FIG. 8 is a perspective view of an apparatus for producing a plastic lens according to the present invention.

DESCRIPTION OF THE PREFERRED EMBODIMENTS

Figure 1:
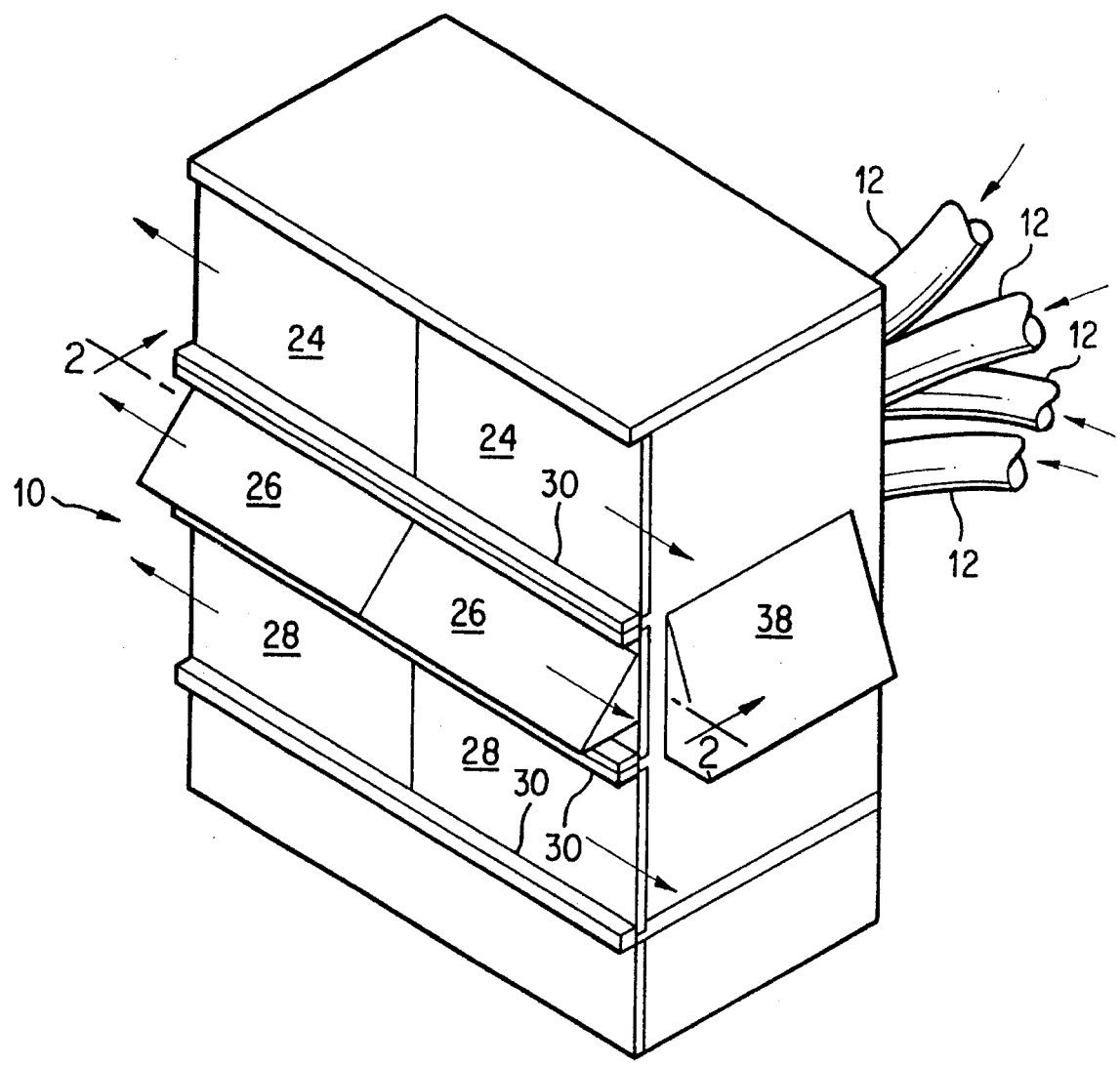
- FIG. 1 is a perspective view of an apparatus for producing a plastic lens according to the present invention.

While various aspects of the present invention are hereinafter illustrated and described as being particularly adapted for the production of a plastic lens for use in eyeglasses, it is to be understood that lenses for other uses can also be produced, such as safety glasses as well as lenses having high quality optical use for instrument sightings, photography and light filtration.

Therefore, the present invention is not to be limited only to the embodiments illustrated in the drawings, because the drawings are merely illustrative of the wide variety of specific embodiments of the present invention.

Referring now to FIG. 1, a plastic lens curing chamber of the present invention is generally indicated by the reference numeral 10. The lens curing chamber 10 communicates through a plurality of pipes 12 with an air source (not shown), the purpose of which will be discussed below.

Figure 2:
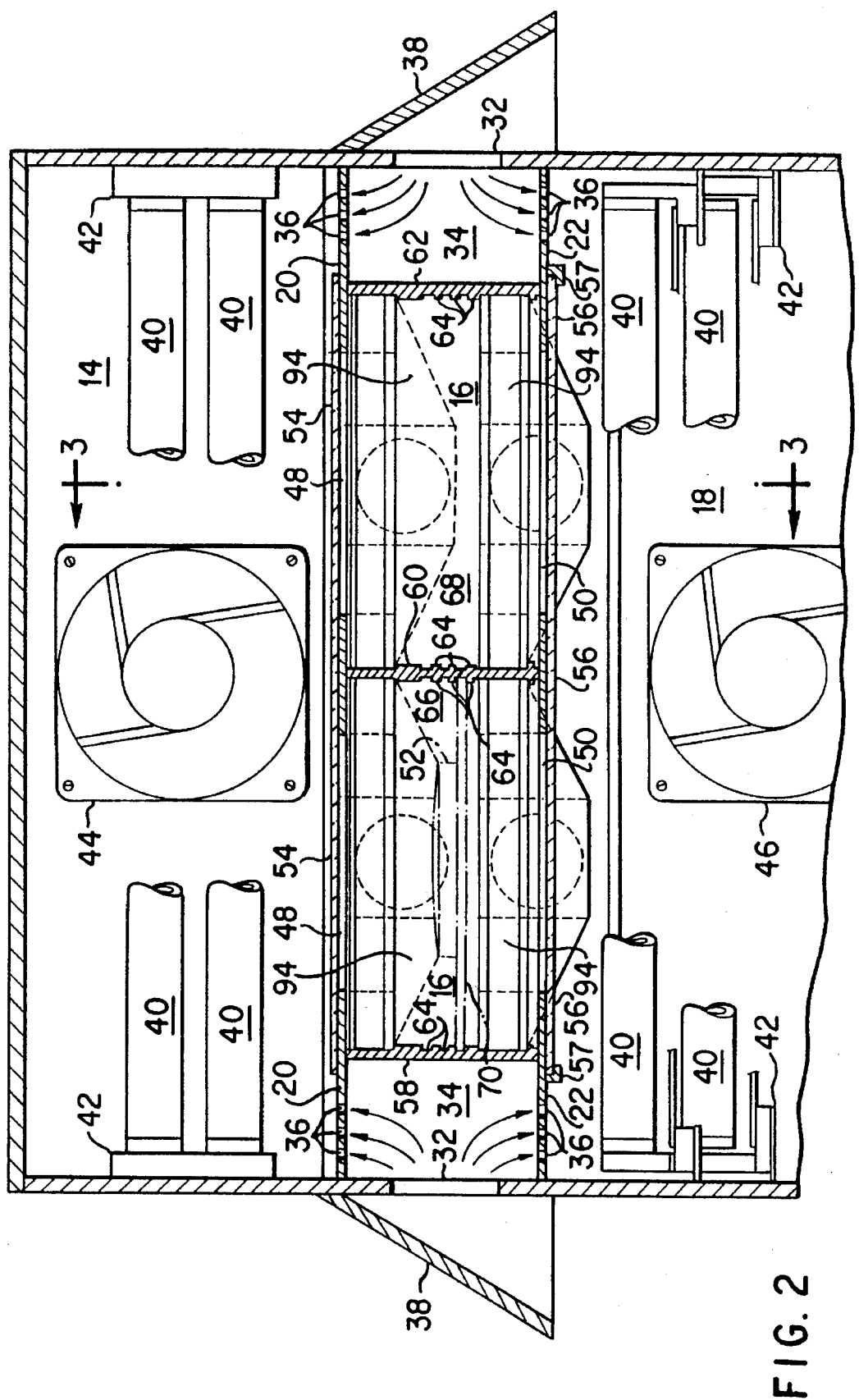
FIG. 2 is a cross-sectional view of the apparatus of the present invention taken along line 2—2 of FIG. 1.

As shown in FIG. 2, the plastic lens curing chamber 10 includes an upper lamp chamber 14, an irradiation chamber 16, and a lower lamp chamber 18. The upper lamp chamber 14 is separated from the irradiation chamber 16 by a plate 20. The lower lamp chamber is separated from the irradiation chamber 16 by a plate 22. The upper lamp chamber 14, the irradiation chamber 16, and the lower lamp chamber 18 may be isolated from ambient air by means of upper lamp chamber doors 24, irradiation chamber doors 26, and lower lamp chamber doors 28, respectively. While the upper lamp chamber doors 24, the irradiation chamber doors 26 and the lower lamp chamber doors 28 are shown in FIG. 1 as including two corresponding door members, those of ordinary skill in the art will recognize that the doors 24, 26 and 28 could comprise a single door member. The upper lamp chamber doors 24, the irradiation chamber doors 26 and the lower lamp chamber doors 28 are slidingly mounted in guides 30. As shown in FIG. 2, vents 32 communicate with upper lamp chamber 14 and lower lamp chamber 18 by way of corresponding vent chambers 34 and openings 36 disposed in plate 20 and plate 22. Each vent 32 is shielded by a vent cover 38.

Figure 3:
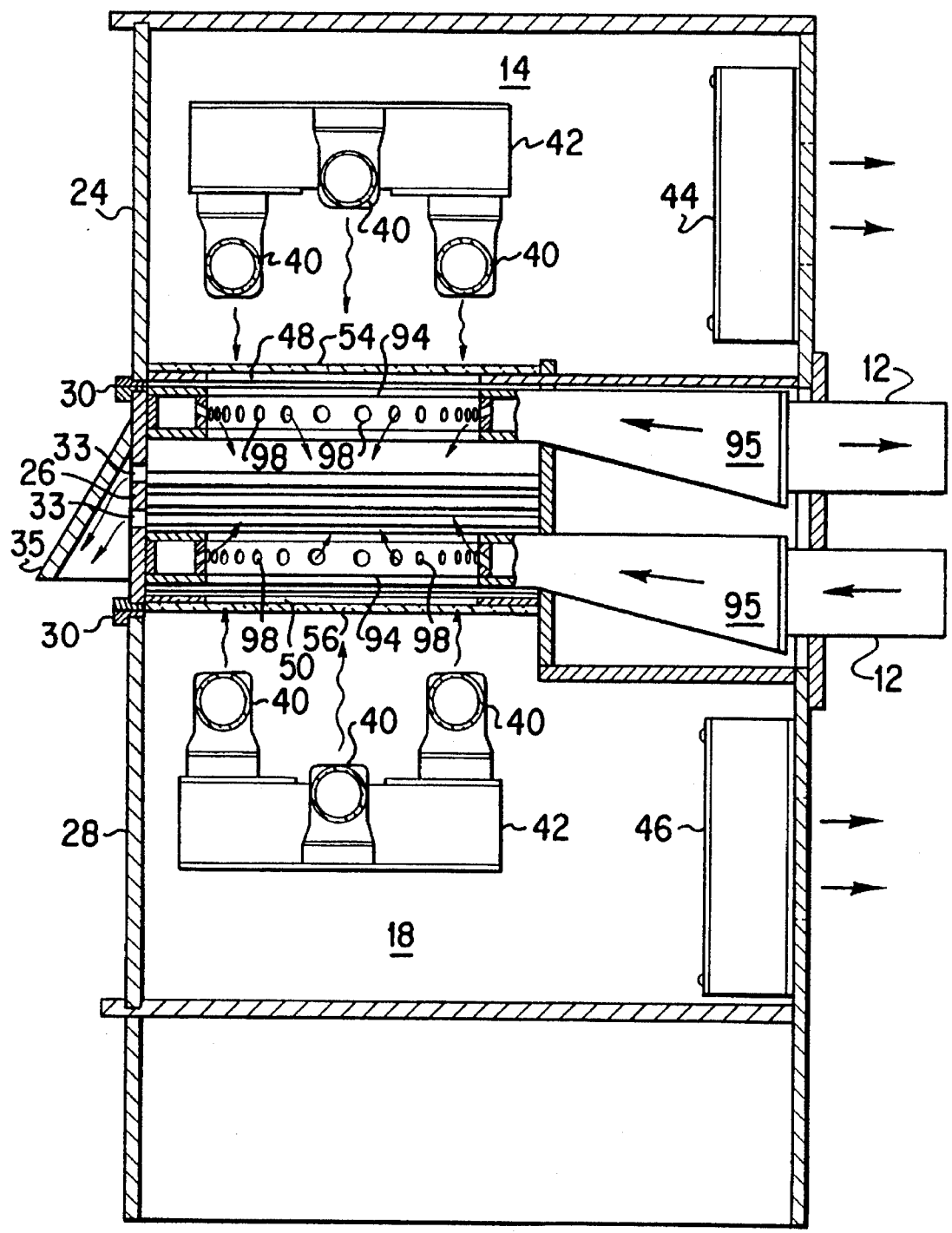
FIG. 3 is a cross-sectional view of the apparatus of the present invention taken along line 3—3 of FIG. 2.

As shown in FIG. 3, vents 33 are disposed in the irradiation chamber doors 26 and communicate with irradiation chamber 16. Each vent 33 is shielded by a vent cover 35.

As shown in FIGS. 2 and 3, a plurality of light generating devices or lamps 40 are disposed within each of upper lamp chamber 14 and lower lamp chamber Preferably, upper lamp chamber 14 and lower lamp chamber 18 each include three lamps 40 that are arranged in a triangular fashion in which the lamps 40 in the upper lamp chamber 14 are disposed with the point of the triangle pointing upwards whereas the lamps 40 in the lower lamp chamber 18 are disposed with the point of the triangle pointing downward. The lamps 40, preferably, generate ultraviolet light having a wavelength in the range of approximately 300 nm to 400 nm since the effective wavelength spectrum for curing the lens forming material lies in the 300 nm to 400 nm region. The lamps 40 are supported by and electrically connected to suitable fixtures 42.

An exhaust fan 44 communicates with upper lamp chamber 14 while an exhaust fan 46 communicates with lower lamp chamber 18.

As noted above, the upper lamp chamber 14 is separated from the irradiation chamber 16 by plate 20. Similarly, lower lamp chamber 18 is separated from the irradiation chamber 16 by plate 22. The plates 20 and 22 include apertures 48 and 50, respectively through which the light generated by lamps 40 may be directed so as to impinge upon a lens cell 52 (shown in phantom in FIG. 2). The diameter of the lens cell 52 according to the present invention, preferably, is approximately 74 mm. The apertures 48 and 50 preferably range from about 70 mm to about 140 mm. An upper light filter 54 rests upon plate 20 while a lower light filter 56 rests upon plate 22 or is supported by brackets 57. The upper light filter 54 and lower light filter 56 are shown in FIG. 2 as being comprised of a single filter member, however, those of ordinary skill in the art will recognize that each of the upper light filter 54 and lower light filter 56 can be comprised of two filter members. The components of upper light filter 54 and lower light filter 56 preferably are modified depending upon the characteristics of the lens to be molded. For instance, in a preferred embodiment for making negative lenses, the upper light filter 54 includes a plate of Pyrex glass that is frosted on both sides resting upon a plate of clear Pyrex glass. The lower light filter 56 includes a plate of Pyrex glass frosted on one side resting upon a plate of clear Pyrex glass with a device for reducing the intensity of ultraviolet light incident upon the center portion in relation to the edge portion of the lens being disposed between the plate of frosted Pyrex and the plate of clear Pyrex glass.

Conversely, in a preferred arrangement for producing positive lenses, the upper light filter 54 includes a plate of Pyrex glass frosted on one or both sides and a plate of clear Pyrex glass resting upon the plate of frosted Pyrex glass with a device for reducing the intensity of ultraviolet light incident upon the edge portion in relation to the center portion of the lens being disposed between the plate of clear Pyrex glass and the plate of frosted Pyrex glass. The lower light filter 56 includes a plate of clear Pyrex glass frosted on one side resting upon a plate of clear Pyrex glass with a device for reducing the intensity of ultraviolet light incident upon the edge portion in relation to the center portion of the lens being disposed between the plates of clear Pyrex glass. In this arrangement, in place of a device for reducing the relative intensity of ultraviolet light incident upon the edge portion of the lens, the diameter of the aperture 50 can be reduced to achieve the same result, i.e. to reduce the relative intensity of ultraviolet light incident upon the edge portion of the lens.

It will be apparent to those skilled in the art that each filter 54 or 56 could comprise a plurality of filter members or comprise any other means or device effective to reduce the light to its desired intensity, to diffuse the light and/or to create a light intensity gradient across the lens cell 52.

Preferably, the upper light filter 54 or the lower light filter 56 each comprise at least one plate of Pyrex glass having at least one frosted surface. Also, either or both of the upper light filter 54 and the lower light filter 56 may include more than one plate of Pyrex glass each frosted on one or both surfaces, and/or one or more sheets of tracing paper. After passing through frosted Pyrex glass, the ultraviolet light is believed to have no sharp intensity discontinuities which is believed to lead to a reduction in optical distortions in the finished lens. Those of ordinary skill in the art will recognize that other means may be used to diffuse the ultraviolet light so that it has no sharp intensity discontinuities.

Figure 4:
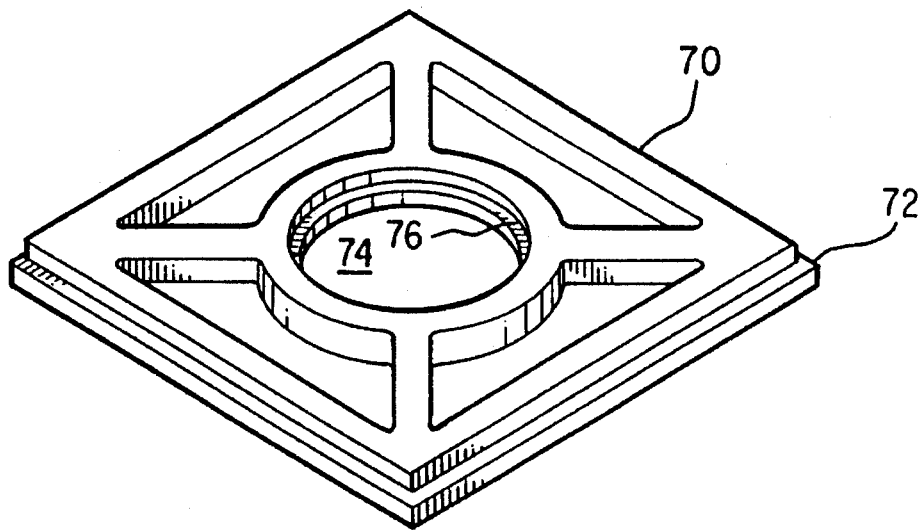
FIG. 4 is a detail view of a component of the apparatus of the present invention.

Disposed within the irradiation chamber 16 are a left stage 58, a center stage 60, and a right stage 62, each of which includes a plurality of steps 64. The left stage 58 and center stage 60 define a left irradiation chamber 66 while the right stage 62 and center stage 60 define a right irradiation chamber 68. A cell holder 70, shown in phantom in FIG. 2 and in detail in FIG. 4, may be disposed within each of left irradiation chamber 66 and right irradiation chamber 68. The cell holder 70 includes a peripheral step 72 that is designed to allow a cell holder 70 to be supported upon complementary steps 64 of left stage 58 and center stage 60, and center stage 60 and right stage 62, respectively. As shown in FIG. 4, each cell holder 70 also includes a central bore 74 to allow the passage therethrough of ultraviolet light from the lamps 40 and an annular step 76 which is designed to support a lens cell 52 in a manner described below.

Figure 6:
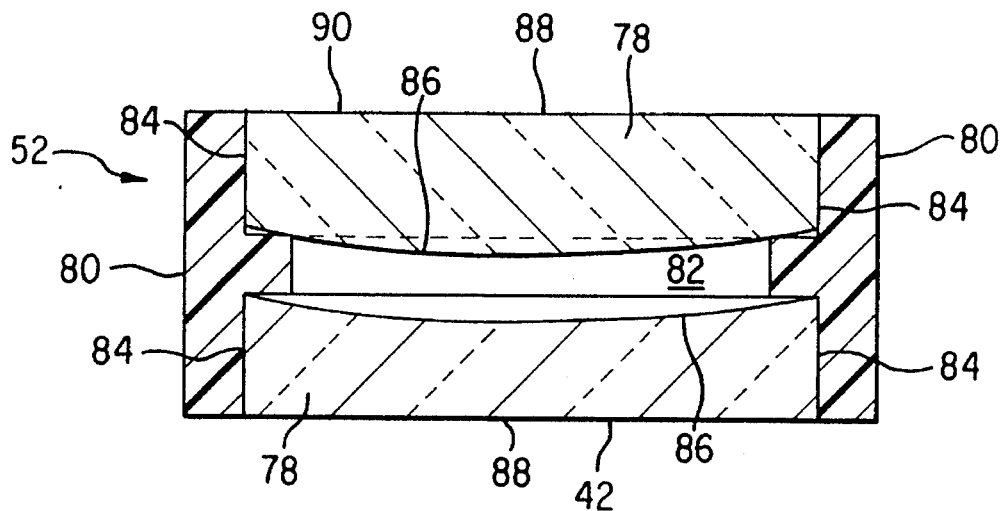
FIG. 6 is a cross-sectional view of a lens cell for use in the apparatus of the present invention.

As shown in FIG. 6, each lens cell 52 includes opposed mold members 78, separated by an annular gasket 80 to define a lens molding cavity 82. The opposed mold members 78 and the annular gasket 80 can be selected in a manner to produce a lens having a desired diopter.

The mold members 78, preferably, are formed of any suitable material that will permit rays of ultraviolet light to pass therethrough. The mold members 78, preferably, are formed of glass. Each mold member 78 has an outer peripheral surface 84 and a pair of opposed surfaces 86 and 88 with the surfaces 86 and 88 being precision ground. Preferably the mold members 78 have desirable ultraviolet light transmission characteristics and both the casting surface 86 and non-casting surface 88 preferably have no surface aberrations, waves, scratches or other defects as these may be reproduced in the finished lens.

As noted above, the mold members 78 are adapted to be held in spaced apart relation to define a lens molding cavity 82 between the facing surfaces 86 thereof. The mold members 78 are held in a spaced apart relation by a T-shaped flexible annular gasket 80 that seals the lens molding cavity 82 from the exterior of the mold members 78. In use, the gasket 80 is supported on the annular step 76 of the cell holder 70.

In this manner, in the embodiment of the present invention that is illustrated in FIG. 6 the upper or back mold member 90 has a convex inner surface 86 while the lower or front mold member 92 has a concave inner surface 86 so that the resulting lens molding cavity 82 is shaped to form a lens with a desired configuration. Thus, by selecting the mold members 78 with a desired surface 86, lenses with different characteristics, such as focal lengths, can be made by the apparatus 10. Such techniques are well known to those skilled in the art, and will therefore not be further discussed.

Rays of ultraviolet light emanating from lamps 40 pass through the mold members 78 and act on a lens forming material disposed in the mold cavity 82 in a manner discussed below so as to form a lens. As noted above, the rays of ultraviolet light pass through a suitable filter 54 or 56 to impinge upon the lens cell 52.

The mold members 78, preferably, are formed from a material that will not allow ultraviolet radiation having a wavelength below approximately 300 nm to pass therethrough. Suitable materials are Schott Crown, S-1 or S-3 glass manufactured and sold by Schott Optical Glass Inc., of Duryea, Pa. or Corning 8092 glass sold by Corning Glass of Corning, New York.

The annular gasket 80 may be formed of vinyl material that exhibits good lip finish and maintains sufficient flexibility at conditions throughout the lens curing process. In a preferred embodiment, the annular gasket 80 is formed of silicone rubber material such as GE SE6035 which is commercially available from General Electric. In another preferred embodiment, the annular gasket 80 is formed of copolymers of ethylene and vinyl acetate which are commercially available from E. I. DuPont de Nemours & Co. under the trade name ELVAX®. Preferred ELVAX® resins are ELVAX® 350 having a melt index of 17.3–20.9 dg/min and a vinyl acetate content of 24.3–25.7 wt. %, ELVAX® 250 having a melt index of 22.0–28.0 dg/min and a vinyl acetate content of 27.2–28.8 wt. %, ELVAX® 240 having a melt index of 38.0–48.0 dg/min and a vinyl acetate content of 27.2–28.8 wt. %, and ELVAX® 150 having a melt index of 38.0–48.0 dg/min and a vinyl acetate content of 32.0–34.0 wt. %. Regardless of the particular material, the gaskets 80 may be prepared by conventional injection molding or compression molding techniques which are well-known by those of ordinary skill in the art.

Figure 5:
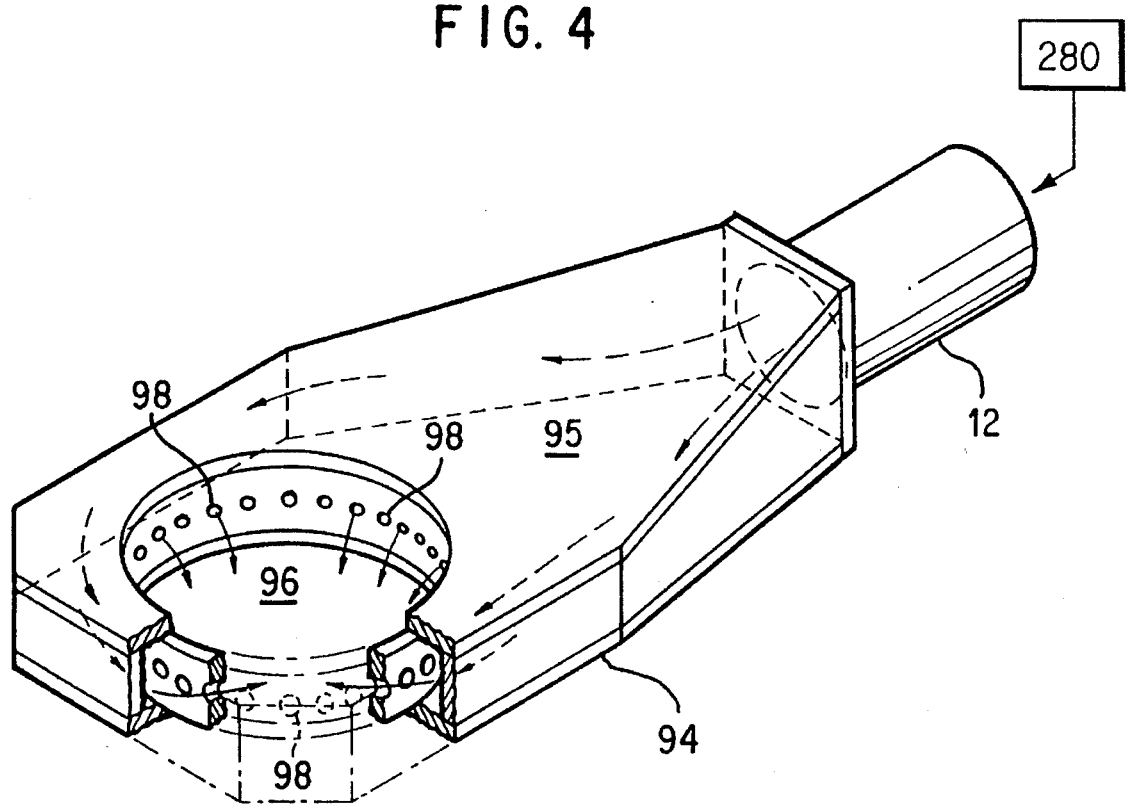
FIG. 5 is a detail view of a component of the apparatus of the present invention.

As shown in phantom in FIG. 2, in section in FIG. 3, and in detail in FIG. 5, an upper and lower air distribution device 94 is disposed in each of left irradiation chamber 66 and right irradiation chamber 68. Each air distribution device 94 is connected to a pipe 12. As shown in FIG. 5, each air distribution device 94 includes a plenum portion 95 and a cylindrical opening 96 having orifices 98 disposed therein to allow for the expulsion of air from the air distribution device 94. The diameter of the orifices 98 varies around the circumference of cylindrical opening 96 preferably reaching a maximum when directly opposite the plenum portion 95 of air distribution device 94 and preferably reaching a minimum immediately adjacent the plenum portion 95. In addition, the orifices 98 are designed to blow air toward a lens cell 52 that may be disposed in a lens cell holder 70 and installed in left irradiation chamber 66 or right irradiation chamber 68.

In operation, the apparatus of the present invention may be appropriately configured for the production of positive lenses which are relatively thick at the center or negative lenses which are relatively thick at the edge. To reduce the likelihood of premature release, the relatively thick portions of a lens preferably are polymerized at a faster rate than the relatively thin portions of a lens.

The rate of polymerization taking place at various portions of a lens may be controlled by varying the relative intensity of ultraviolet light incident upon particular portions of a lens. The rate of polymerization taking place at various portions of a lens may also be controlled by directing air across the mold members 78 to cool the lens cell 52.

For positive lenses the intensity of incident ultraviolet light, preferably, is reduced at the edge portion of the lens so that the thicker center portion of the lens polymerizes faster than the thinner edge portion of the lens. Conversely, for a negative lens, the intensity of incident ultraviolet light, preferably, is reduced at the center portion of the lens so that the thicker edge portion of the lens polymerizes faster than the thinner center portion of the lens. For either a positive lens or a negative lens, air may be directed across the faces of the mold members 78 to cool the lens cell 52. As the overall intensity of incident ultraviolet light is increased, more cooling is needed which can be accomplished by either or both of increasing the velocity of the air and reducing the temperature of the air.

It is well known by those of ordinary skill in the art that the lens forming material having utility in the present invention shrinks as it cures. If the relatively thin portion of a lens is allowed to polymerize before the relatively thick portion, the relatively thin portion will be rigid at the time the relatively thick portion cures and shrinks and the lens will either release prematurely from or crack the mold members 78. Accordingly, when the relative intensity of ultraviolet light incident upon the edge portion of a positive lens is reduced relative to the center portion, the center portion polymerizes faster and shrinks before the edge portion is rigid so that the shrinkage is more uniform. Conversely, when the relative intensity of ultraviolet light incident upon the center portion of a negative lens is reduced relative to the edge portion, the edge portion polymerizes faster and shrinks before the center becomes rigid so that the shrinkage is more uniform.

According to the present invention, the variation of the relative intensity of ultraviolet light incident upon a lens may be accomplished in a variety of ways. According to one method, in the case of a positive lens, a ring of opaque material may be placed between the lamps 40 and the lens cell 52 so that the incident ultraviolet light falls mainly on the thicker center portion of the lens. Conversely, for a negative lens, a disk of opaque material is placed between the lamps 40 and the lens cell 52 so that the incident ultraviolet light falls mainly on the edge portion of the lens.

According to another method, in the case of a negative lens, a sheet material having a variable degree of opacity ranging from opaque at a central portion to transparent at a radial outer portion is disposed between the lamps 40 and the lens cell 52. Conversely, for a positive lens, a sheet material having a variable degree of opacity ranging from transparent at a central portion to opaque at a radial outer portion is disposed between the lamps 40 and the lens cell 52.

According to still another method, a plurality of ultraviolet-light absorbing geometric or random shapes are printed and arranged on a sheet material. In the case of a positive lens, the density of the shapes is greatest at a radial outer portion while the density of the shapes is smallest at a central portion of the pattern. Conversely, in the case of a negative lens, the density of the shapes is smallest at a radial outer portion while the density of the shapes is greatest at a central portion of the pattern.

Those of ordinary skill in the art will recognize that there are a wide variety of techniques other than those enumerated above for varying the intensity of the ultraviolet light incident upon the opposed mold members 78.

The intensity of the incident light has been measured and determined to be approximately 3.0 to 5.0 milliwatts per square centimeter ($mW/cm^2$) prior to passing through either the upper light filter 54 or the lower light filter 56 and the total intensity at the thickest part of the lens ranges from 0.6 to 2.0 $mW/cm^2$ while the intensity at the thinnest portion of the lens ranges from 0.1 to 1.5 $mW/cm^2$. It has also been determined that the overall light intensity incident on the lens cell 52 has less of an impact on the final product than the relative light intensity incident upon the thick or thin portions of the lens so long as the lens cell 52 is sufficiently cooled to reduce the polymerization rate to an acceptable level.

According to the present invention, it has been determined that the finished power of an ultraviolet light polymerized lens can be controlled by manipulating the distribution of the incident ultraviolet light striking the opposed mold members 78. For instance, for an identical combination of mold members 78 and gasket 80, the focusing power of the produced lens can be increased or decreased by changing the pattern of intensity of ultraviolet light across the lens mold cavity 82 or the faces of the opposed mold members 78.

As the lens forming material begins to cure, it passes through a gel state, the pattern of which within the lens cell 52 leads to the proper distribution of internal stresses generated later in the cure when the lens forming material begins to shrink.

As the lens forming material shrinks during the cure, the opposed mold members 78 will flex as a result of the different amounts of shrinkage between the relatively thick and the relatively thin portions of the lens. When a negative lens, for example, is cured, the upper or back mold member 90 will flatten and the lower or front mold member 92 will steepen with most of the flexing occurring in the lower or front mold member 92. Conversely, with a positive lens, the upper or back mold member 90 will steepen and the lower or front mold member 92 will flatten with most of the flexing occurring in the upper or back mold member 90.

By varying the intensity of the ultraviolet light between the relatively thin and the relatively thick portions of the lens in the lens forming cavity 82, it is possible to create more or less total flexing. Those light conditions which result in less flexing will minimize the possibility of premature release.

The initial curvature of the opposed mold members 78 and the center thickness of the lens produced can be used to compute the theoretical or predicted power of the lens. The ultraviolet light conditions can be manipulated to alter the power of the lens to be more or less than predicted. For example, when a disk of opaque material is positioned between the lower lamp chamber 18 and the lens cell 52, less total flexure is observed. The greater the diameter of the disk of opaque material, the more negative (−) power the resultant lens will exhibit.

When the lenses cured by the ultraviolet light are removed from the opposed mold members 78, they are under a stressed condition. It has been determined that the power of the lens can be brought to a final resting power, by subjecting the lenses to a post-curing heat treatment to relieve the internal stresses developed during the cure and cause the curvature of the front and the back of the lens to shift. Typically, the lenses are cured by the ultraviolet light in about 10–30 minutes. The post-curing heat treatment is conducted at approximately 85°–120° C. for approximately 5–15 minutes. Preferably, the post-curing heat treatment is conducted at 100°–110° C. for approximately 10 minutes. Prior to the post-cure, the lenses generally have a lower power than the final resting power. The post-curing heat treatment reduces yellowing of the lens and reduces stress in the lens to alter the power thereof to a final power. The post-curing heat treatment can be conducted in a conventional convection oven or any other suitable device.

According to the present invention, the ultraviolet lamps 40 preferably are maintained at a temperature at which the lamps 40 deliver maximum output. The lamps 40, preferably, are cooled because the intensity of the light produced by the lamps 40 fluctuates when the lamps 40 are allowed to overheat. In the apparatus of the present invention depicted in FIG. 2, the cooling of the lamps 40 is accomplished by sucking ambient air into the upper lamp chamber 14 and lower lamp chamber 18 through vent 32, vent chambers 34 and openings 36 by means of exhaust fans 44 and 46, respectively. Excessive cooling of the lamps 40 should be avoided, however, as the intensity of the light produced by the lamps 40 is reduced when the lamps 40 are cooled to an excessive degree.

As noted above, according to the present invention, the lens cell 52, preferably, is cooled during curing of the lens forming material as the overall intensity of the incident ultraviolet light is increased. Cooling of the lens cell 52 generally reduces the likelihood of premature release by slowing the reaction and improving adhesion. There are also improvements in the optical quality, stress characteristics and impact resistance of the lens. Cooling of the lens cell 52, preferably, is accomplished by blowing air across the lens cell 52. The air preferably has a temperature ranging between 15 and 85° F. to allow for a curing time of between 30 and 10 minutes. The air distribution devices 94 depicted in FIG. 5 have been found to be particularly advantageous as they are specifically designed to direct air directly across the surface of the opposed mold members 78. After passing across the surface of the opposed mold members 78, the air emanating from the air distribution devices 94 is vented through vents 33.

The lens cell 52 may also be cooled by disposing the lens cell in a liquid cooling bath.

The opposed mold members 78, preferably, are thoroughly cleaned between each curing nm as any dirt or other impurity on the mold members 78 may cause premature release. The mold members 78 are cleaned by any conventional means well known to those of ordinary skill in the art such as with a domestic cleaning product i.e. Mr. Clean® available from Procter and Gamble. Those of ordinary skill in the art will recognize, however, that many other techniques may also be used for cleaning the mold members 78.

Yellowing of the finished lens may be related to the monomer composition, the identity of the photoinitiator and the concentration of the photoinitiator.

When casting a lens, particularly a positive lens that is thick in the center, cracking may be a problem. Addition polymerization reactions, including photochemical addition polymerization reactions, are exothermic. During the process, a large temperature gradient may build up and the resulting stress may cause the lens to crack.

When the polymerization reaction proceeds too rapidly, heat buildup inside the system which leads to cracking is inevitable. The likelihood of cracking increases as the temperature difference between the center of the lens forming material and room temperature increases. During the polymerization process, several forces tending to crack the lens, such as shrinkage, adhesion, and thermal gradients, are at work. Other forces tending to crack the lens may occur when the irradiation is stopped and the lens is cooled, especially if the lens cell 52 is allowed to cool too quickly.

The formation of optical distortions usually occurs during the early stages of the polymerization reaction during the transformation of the lens forming composition from the liquid to the gel state. Once patterns leading to optical distortions form they are almost impossible to eliminate. When gelation occurs there is a rapid temperature rise. The exothermic polymerization step causes a temperature increase, which in turn causes an increase in the rate of polymerization, which causes a further increase in temperature. If the heat exchange with the surroundings is not sufficient enough there will be a runaway situation that leads to premature release, the appearance of thermally caused striations and even breakage. Since the rate of polymerization increases rapidly at the gelation point, this is an important phase of the reaction.

Accordingly, it is preferred that the reaction process be smooth and not too fast but not too slow. Heat must not be generated by the process so fast that it cannot be exchanged with the surroundings. The incident ultraviolet light intensity preferably is adjusted to allow the reaction to proceed at a desired rate. It is also preferred that the seal between the annular gasket 80 and the opposed mold members 78 is as complete as possible.

Factors that have been found to lead to the production of lenses that are free from optical distortions are (1) achieving a good seal between the annular gasket 80 and the opposed mold members 78; (2) using mold members 78 having surfaces that are free from defects; (3) using a formulation having an appropriate type and concentration of photoinitiator that will produce a reasonable rate of temperature rise; and (4) using a homogeneous formulation. Preferably, these conditions are optimized.

Premature release of the lens from the mold will result in an incompletely cured lens and the production of lens defects. Factors that contribute to premature release are (1) a poorly assembled lens cell 52; (2) the presence of air bubbles around the sample edges; (3) imperfection in gasket lip or mold edge; (4) inappropriate (formulation; (5) uncontrolled temperature rise; and (6) high or nonuniform shrinkage. Preferably, these conditions are minimized.

Premature release can also occur when the opposed mold members 78 are held too rigidly by the annular gasket 80. Preferably, there is sufficient flexibility in the annular gasket 80 to permit the opposed mold members 78 to follow the lens as it shrinks. In this regard, reference is made to U.S. Pat. Nos. 3,038,210 and 3,222,432, the disclosures of which are specifically incorporated herein by reference. Indeed, the lens must be allowed to shrink in diameter slightly as well as in thickness. The use of an annular gasket 80 that has a reduced degree of stickiness with the lens during and after curing is therefore desirable.

In a preferred technique for filling the lens molding cavity 82, the annular gasket 80 is placed on a concave or front mold member 92 and a convex or back mold member 90 is moved into place. The annular gasket 80 is then pulled away from the edge of the back mold member 90 at the uppermost point and a lens forming composition is injected into the lens molding cavity 82 until a small amount of the lens forming composition is forced out around the edge. The excess is then removed, preferably, by vacuum. Excess liquid that is not removed could spill over the face of the back mold member 90 and cause optical distortion in the finished lens.

Despite the above problems, the advantages offered by the radiation cured lens molding system clearly outweigh the disadvantages. The advantages of a radiation cured system include a significant reduction in energy requirements, curing time and other problems normally associated with conventional thermal systems.

According to the present invention, the lens forming material can comprise any suitable liquid monomer or monomer mixture and any suitable photosensitive initiator. The lens forming material, preferably, does not include any component, other than a photoinitiator, that absorbs ultraviolet light having a wavelength in the range of 300 to 400 nm. The liquid lens forming material, preferably, is filtered for quality control and placed in the lens molding cavity 82 by pulling the annular gasket 80 away from one of the opposed mold members 78 and injecting the liquid lens forming material into the lens molding cavity 82. Once the lens molding cavity 82 is filled with such material, the annular gasket 80 is replaced into its sealing relation with the opposed mold members 78. The material can then be irradiated with ultraviolet light in the manner described above for a time period that is necessary to cure the lens forming material, preferably approximately 10 to approximately 30 minutes. The ultraviolet light entering the lens molding cavity 82 preferably has a wavelength in the range of approximately 300 nm. to approximately 400 nm.

Those skilled in the art will recognize that once the cured lens is removed from the lens molding cavity 82 by disassembling the opposed mold members 78, the lens can be further processed in a conventional manner, such as by grinding its peripheral edge.

According to the present invention a polymerizable lens forming composition comprises an aromatic-containing bis-(allyl carbonate)-functional monomer and at least one polyethylenic-functional monomer containing two ethylenically unsaturated groups selected from acrylyl and methacrylyl. In a preferred embodiment, the composition further comprises a suitable photoinitiator. In other preferred embodiments, the composition may include one or more polyethylenic-functional monomers containing three ethylenically unsaturated groups selected from acrylyl and methacrylyl, and a dye.

Aromatic-containing bis(allyl carbonate)-functional monomers which can be utilized in the practice of the present invention are bis(allyl carbonates) of dihydroxy aromatic-containing material. The dihydroxy aromatic-containing material from which the monomer is derived may be one or more dihydroxy aromatic-containing compounds. Preferably the hydroxyl groups are attached directly to nuclear aromatic carbon atoms of the dihydroxy aromatic-containing compounds. The monomers are themselves known and can be prepared by procedures well known in the art. See, for example, U.S. Pat. Nos. 2,370,567; 2,455,652; 2,455,653; and 2,587,437, the disclosures of which are incorporated herein by reference.

The aromatic-containing bis(allyl carbonate)-functional monomers can be represented by the formula:

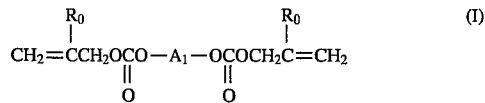

in which $A_1$ is the divalent radical derived from the dihydroxy aromatic-containing material and each $R_0$ is independently hydrogen, halo, or a $C_1$–$C_4$ alkyl group. The alkyl group is usually methyl or ethyl. Examples of $R_0$ include hydrogen, chloro, bromo, fluoro, methyl, ethyl, n-propyl, isopropyl and n-butyl. Most commonly $R_0$ is hydrogen or methyl; hydrogen is preferred. A subclass of the divalent radical $A_1$ which is of particular usefulness is represented by the formula:

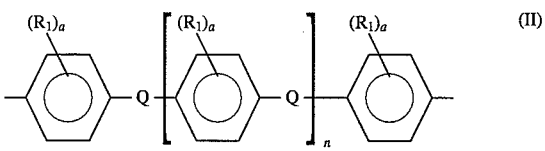

in which each $R_1$ is independently alkyl containing from 1 to about 4 carbon atoms, phenyl, or halo; the average value of each a is independently in the range of from 0 to 4; each Q is independently oxy, sulfonyl, alkanediyl having from 2 to about 4 carbon atoms, or alkylidene having from 1 to about 4 carbon atoms; and the average value of n is in the range of from 0 to about 3. Preferably Q is methylethylidene, viz., isopropylidene.

Preferably the value of n is zero, in which case $A_1$ is represented by the formula:

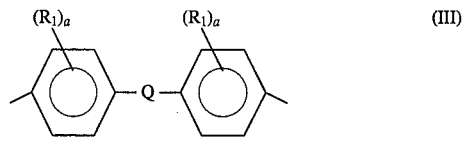

in which each $R_1$, each a, and Q are as discussed in respect of Formula II. Preferably the two free bonds are both in the ortho or para positions. The para positions are especially preferred.

The dihydroxy aromatic-containing compounds from which $A_1$ is derived may also be polyol-functional chain extended compounds. Examples of such compounds include alkylene oxide extended bisphenols. Typically the alkylene oxide employed is ethylene oxide, propylene oxide, or mixtures thereof. By way of exemplification, when para, para-bisphenols are chain extended with ethylene oxide, the bivalent radical $A_1$ may often be represented by the formula:

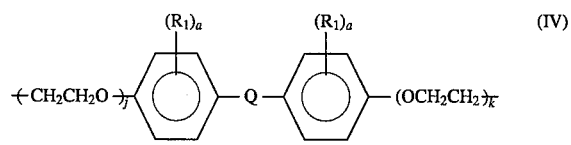

where each $R_1$, each a, and Q are as discussed in respect of Formula II, and the average values of j and k are each independently in the range of from about 1 to about 4.

The preferred aromatic-containing bis(allyl carbonate)-functional monomer is represented by the formula:

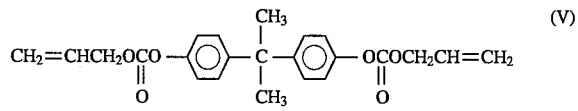

and is commonly known as bisphenol A bis(allyl carbonate).

A wide variety of compounds may be used as the polyethylenic functional monomer containing two or three ethylenically unsaturated groups. The preferred polyethylenic functional compounds containing two or three ethylenically unsaturated groups may be generally described as the acrylic acid esters and the methacrylic acid esters of aliphatic polyhydric alcohols, such as, for example, the di- and triacrylates and the di- and trimethacrylates of ethylene glycol, triethylene glycol, tetraethylene glycol, tetramethylene glycol, glycidyl, diethyleneglycol, butyleneglycol, propyleneglycol, pentanediol, hexanediol, trimethylolpropane, and tripropyleneglycol. Examples of specific suitable polyethylenic—functional monomers containing two or three ethylenically unsaturated groups include trimethylolpropanetriacrylate (TMPTA), tetraethylene glycol diacrylate (TTEGDA), tripropylene glycol diacrylate (TRPGDA), 1,6 hexanedioldimethacrylate (HDDMA), and hexanedioldiacrylate (HDDA).

In general, a photoinitiator for initiating the polymerization of the lens forming composition of the present invention, preferably, exhibits an ultraviolet absorption spectrum over the 300–400 nm range. High absorptivity of a photoinitiator in this range, however, is not desirable, especially when casting a thick lens. The following are examples of illustrative photoinitiator compounds within the scope of the invention: methyl benzoylformate, 2-hydroxy-2-methyl-1-phenylpropan-1-one, 1-hydroxycyclohexyl phenyl ketone, 2,2-di-secbutoxyacetophenone, 2,2-diethoxyacetophenone, 2,2-diethoxy-2-phenyl-acetophenone, 2,2-dimethoxy-2-phenyl-acetophenone, benzoin methyl ether, benzoin isobutyl ether, benzoin, benzil, benzyl disulfide, 2,4-dihydroxybenzophenone, benzylideneacetophenone, benzophenone and acetophenone. Especially preferred photoinitiator compounds are 1-hydroxycyclohexyl phenyl ketone which is commercially available from Ciba-Geigy as Irgacure 184 and methyl benzoylformate which is commercially available from Polysciences, Inc.

A strongly absorbing photoinitiator will absorb most of the incident light in the first millimeter of lens thickness, causing rapid polymerization in that region. The remaining light will produce a much lower rate of polymerization below this depth and will result in a lens that has visible distortions. An ideal photoinitiator will exhibit high activity, but will have a lower extinction coefficient in the useful range. A lower extinction coefficient of photoinitiators at longer wavelengths allows the ultraviolet radiation to penetrate deeper into the reaction system. This deeper penetration of the ultraviolet radiation allows photoinitiator radicals to form uniformly throughout the sample and provide excellent overall cure. Since the sample can be irradiated from both top and bottom, a system in which appreciable light reaches the center of the thickest portion of the lens is essential. The photoinitiator solubility and compatibility with the monomer system is also an essential requirement.

An additional consideration is the effect of the photoinitiator fragments in the finished polymer. Some photoinitiators generate fragments that impart a yellow color to the finished lens. Although such lenses actually absorb very little visible light, they are cosmetically undesirable.

Photoinitiators are often very system specific so that photoinitiators that are very efficient in one system may function quite poorly in another. In addition, the initiator concentration to a large extent is dependent on the incident light intensity and the monomer composition. The identity of the initiator and its concentration are very important for any particular formulation. A concentration of initiator that is too high leads to cracking and yellowing of the lens. Concentrations of initiator that are too low lead to incomplete polymerization and a soft material.

Dyes and/or pigments are optional materials that may be present when high transmission of light is not necessary.

The listing of optional ingredients discussed above is by no means exhaustive. These and other ingredients may be employed in their customary amounts for their customary purposes so long as they do not seriously interfere with good polymer formulating practice.

According to a preferred embodiment of the present invention, the preferred aromatic-containing bis(allyl carbonate) functional monomer, bisphenol A bis(allyl carbonate) is admixed with one or more faster reacting polyethylenic functional monomers containing two acrylate or methacrylate groups such as 1,6 hexanediol dimethacrylate (HDDMA), 1,6 hexanediol diacrylate (HDDA), tetraethylene glycol diacrylate (TTEGDA), and tripropylene glycol diacrylate (TRPGDA) and optionally a polyethylenic functional monomer containing three acrylate groups such as trimethylolpropane triacrylate (TMPTA). Generally, compounds containing acrylate groups polymerize much faster than those containing allyl groups.

The lamps 40 generate an intensity at the lamp surface of approximately 4.0 to 7.0 mW/cm$^2$ of ultraviolet light having wavelengths between 300 and 400 nm, which light is very uniformly distributed without any sharp discontinuities throughout the reaction process. Such bulbs are commercially available from Sylvania under the trade designation Sylvania Fluorescent (F158T/2052) or Sylvania Fluorescent (F258T8/350BL/18") GTE. As noted above, ultraviolet light having wavelengths between 300 and 400 nm is preferred because the photoinitiators according to the present invention, preferably, absorb most efficiently at this wavelength and the mold members 78, preferably, allow maximum transmission at this wavelength.

It is preferred that there be no sharp intensity gradients of ultraviolet radiation either horizontally or vertically through the lens composition during the curing process. Sharp intensity gradients through the lens may lead to defects in the finished lens.

According to one embodiment of the present invention, the liquid lens forming composition includes bisphenol A bis(allyl carbonate) in place of DEG-BAC. The bisphenol A bis(allyl-carbonate) monomer has a higher refractive index than DEG-BAC which allows the production of thinner lenses which is especially important with relatively thick positive or negative lenses. The bisphenol A bis(allyl-carbonate) monomer is commercially available from PPG Industries under the trade name HIRI I or CR-73. Lenses made from this product sometimes have a very slight, barely detectable, degree of yellowing. A small amount of a blue dye consisting of 9, 10-anthracenedione, 1-hydroxy-4-[(4-methylphenyl)amino] available as Thermoplast Blue 684 from BASF Wyandotte Corp. is preferably added to the composition to counteract the yellowing. In addition, the yellowing disappears if the lens is subjected to the above-described post-cure heat treatment. Moreover, if not post-cured the yellowing disappears at ambient temperature after approximately 2 months.

According to a preferred embodiment, the composition of the present invention includes (a) hisphenol A-bis(allyl carbonate); (b) at least one of HDDMA, TTEGDA and TRPGDA; and (c) a photoinitiator. According to this embodiment the composition may also include one or both of TMPTA and a dye.

According to another preferred embodiment, the composition of the present invention includes (a) up to 70 percent by weight of hisphenol A bis(allyl carbonate); (b) up to 100 percent by weight of HDDMA; (c) up to 100 percent by weight of TTEGDA; (d) up to 100 percent by weight of TRPGDA; and (e) up to 100 percent by weight of TMPTA. Preferably, the composition further comprises (f) up to about 1.0 percent by weight of 1-hydroxycyclohexylphenyl ketone; and (g) up to about 1.2 percent by weight of methyl benzoylformate. Most preferably, the composition further comprises (h) up to about 1.0 parts per million (ppm) of 9,10-anthracenedione, 1-hydroxy-4-[(4-methylphenyl)amino].

According to still another preferred embodiment, the composition of the present invention includes (a) about 15.0 to about 25.0 percent by weight of hisphenol A bis(allyl-carbonate); (b) about 8.0 to about 14.0 percent by weight of HDDMA; (c) about 15.0 to about 25.0 percent by weight of TTEGDA; (d) about 17.0 to about 37.0 percent by weight of TRPGDA; and (e) about 15.0 to about 25.0 percent by weight of TMPTA. The composition may also include (f) about 0.003 to about 0.04 percent by weight of 1-hydroxycyclohexylphenyl ketone, (g) about 0.015 to about 0.05 percent by weight of methyl benzoylformate, and (h) about 0.16 to about 0.20 ppm of 9,10-anthracenedione, 1-hydroxy-4-[(4-methylphenyl)amino].

According to a further preferred embodiment, the composition includes 17.0% by weight of hisphenol A bis(allyl carbonate), 10.0% by weight of HDDMA, 21.0% by weight of TTEGDA, 32.0% by weight of TRPGDA, and 20.0% by weight of TMPTA. The composition may also include 0.0095% by weight of 1-hydroxycyclohexylphenyl ketone, 0.0356% by weight of methyl benzoylformate, and 0.16 ppm of 9,10-anthracenedione, 1-hydroxy-4-[(4-methylphenyl)amino].

As discussed above, hisphenol A bis(allyl carbonate) has a much higher refractive index than DEG-BAC and thus allows the production of thinner lenses when compared to DEG-BAC lenses.

TTEGDA, available from Sartomer and Radcure, is a diacrylate monomer that, preferably, is included in the composition because it is a fast polymerizing monomer that reduces yellowing and yields a very clear product. If too much TTEGDA is included in the most preferred composition, i.e. greater than about 25% by weight, however, the finished lens may be prone to cracking and may be too flexible as this material softens at temperatures above 40° C. If TTEGDA is excluded altogether, the finished lens may to be brittle.

HDDMA, available from Sartomer, is a dimethacrylate monomer that has a very stiff backbone between the two methacrylate groups. HDDMA, preferably, is included in the composition because it yields a stiffer polymer and increases the hardness and strength of the finished lens. This material is quite compatible with the hisphenol A bis(allyl carbonate) monomer. HDDMA contributes to high temperature stiffness, polymer clarity and speed of polymerization.

TRPGDA, available from Sartomer and Radcure, is a diacrylate monomer that, preferably, is included in the composition because it provides good strength and hardness without adding brittleness to the finished lens. This material is also stiffer than TTEGDA.

TMPTA, available from Sartomer and Radcure, is a triacrylate monomer that, preferably, is included in the composition because it provides much more crosslinking in the finished lens than the difunctional monomers. TMPTA has a shorter backbone than TTEGDA and increases the high temperature stiffness and hardness of the finished lens. Moreover, this material contributes to the prevention of optical distortions in the finished lens. TMPTA also contributes to high shrinkage during polymerization. The inclusion of too much of this material in the most preferred composition, may make the finished lens too brittle.

Certain of the monomers that are preferably utilized in the composition of the present invention, such as TTEGDA, TRPGDA and TMPTA, include impurities and have a yellow color in certain of their commercially available forms. The yellow color of these monomers is preferably reduced or removed by passing them through a column of alumina (basic) which includes aluminum oxide powder basic. After passage through the alumina column, the monomers absorb almost no ultraviolet light. Also after passage through the alumina column differences between monomers obtained from different sources are substantially eliminated. It is preferred, however, that the monomers be obtained from a source which provides the monomers with the least amount of impurities contained therein. The composition preferably is filtered prior to polymerization thereof to remove suspended particles.

The composition of the present invention, preferably, may be prepared according to the following protocol. Appropriate amounts of HDDMA, TTEGDA, TMPTA and TRPGDA are mixed and stirred thoroughly, preferably with a glass rod. The acrylate/methacrylate mixture may then be passed through a purification column.

A suitable purification column may be disposed within a glass column having a fritted glass disk above a teflon stopcock and having a top reservoir with a capacity of approximately 500 ml and a body with a diameter of 22 mm and a length of about 47 cm. The column may be prepared by placing on the fritted glass disk approximately 35 g. of activated alumina (basic), available from ALFA Products, Johnson Matthey, Danvers, Mass. in a 60 mesh form or from Aldrich in a 150 mesh form. Approximately 10 g. of an inhibitor remover (hydroquinone/methylester remover) available as HR-4 from Scientific Polymer Products, Inc., Ontario, N.Y. then may be placed on top of the alumina and, finally, approximately 35 g. of activated alumina (basic) may be placed on top of the inhibitor remover.

Approximately 600 g. of the acrylate/methacrylate mixture may then be added above the column packing. An overpressure of 2–3 psi may then be applied to the top of the column resulting in a flow rate of approximately 30 to 38 grams per hour. Parafilm may be used to cover the junction of the column tip and the receiving bottle to prevent the infiltration of dust and water vapor. The acrylate/methacrylate mixture, preferably, may be received in a container that is opaque to ultraviolet radiation.

An appropriate amount of hisphenol A bis(allyl carbonate) may then be added to the acrylate/methacrylate mixture to prepare the final monomer mixture.

An appropriate amount of a photoinitiator may then be added to the final monomer mixture. The final monomer mixture, with or without photoinitiator, may then be stored in a container that is opaque to ultraviolet radiation.

An appropriate amount of a dye may also be added to the final monomer mixture, with or without photoiniator.

After edging, the ultraviolet light cured lenses of the present invention demonstrate excellent organic solvent resistance to acetone, methylethyl ketone, and alcohols.

Premature release may occur if the temperature rise of the lens forming composition is uncontrolled. Premature release may also occur if the opposed mold members 78 are held too rigidly by the annular gasket 80. There must be sufficient flexibility in the gaskets 80 to permit the mold members 78 to follow the lens as it shrinks. Insufficient sealing, unsuitable gasket material and/or a small residual amount of uncured material have also been found to contribute to premature release failures.

For best results, both the casting surfaces 86 and non-casting surfaces 88 of the mold members 78 are finished to optical quality. For instance, a wave on the non-casting surface 88 may be reproduced in the finished lens as a result of the distortion of the incident light.

Mold markings cause differential light intensity conditions under the marking, even when the mark is on the non-casting surface 88 of the mold members 78. The fully exposed region of the lens will be harder, and the lens may have stresses because of this. The portion of the lens under the mark will be weaker at the end of the curing period. This effect has been observed and can cause premature release or induce cracking.

Mold defects at the edges interfere with the sealing conditions and frequently induce premature release.

Figure 7:
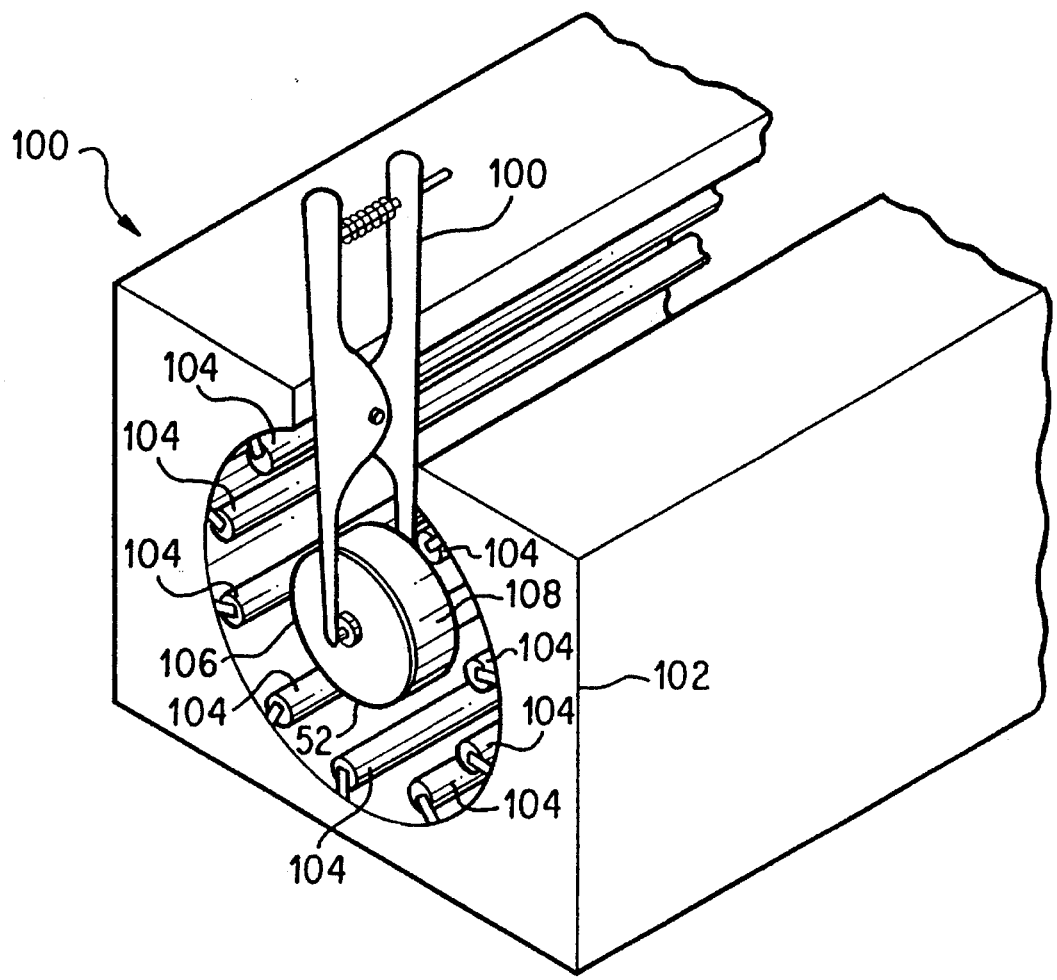
FIG. 7 is a perspective view of an apparatus for producing a plastic lens according to the present invention.

According to the present invention, plastic lenses may be produced by irradiating the lens forming material with ultraviolet light that is prevented from passing through the faces of the opposed mold members 78 and instead passes through the transparent or translucent wall of annular gasket 80 of the lens cell 52. By irradiating in this manner, the thicker edge portion of a negative lens receives a higher level of light intensity than the thinner center portion since the light intensity drops as it passes through the deeper layers of the lens material and glass molds. This method has a desirable advantage of allowing the application of clamping pressure to the front and back molds, which is useful in controlling premature release. This technique will be referred to as through-the-gasket irradiation. Referring to FIG. 7, apparatus 100 is shown for carrying out through-the-gasket irradiation. Apparatus 100 includes lamp chamber 102 having a plurality of ultraviolet light generating lamps 104 disposed therein. A lens cell 52 in accordance with FIG. 6 is suspended in lamp chamber 102. A cover 106 of opaque material is placed over the non-casting surface 88 of each mold member 78 of the lens cell 52. In this manner, ultraviolet light emanating from the plurality of lamps 104 that is incident upon the lens cell 52 acts upon the lens forming material disposed in the lens molding cavity 82 by passing through the outer wall 108 of the annular gasket 80. A spring-loaded clamp 110, preferably, may be used to apply compression pressure upon the opposed mold members 78 of the lens cell 52. The spring-loaded clamp, preferably, may be adjusted to exert variable pressure upon the opposed mold members 78. Moreover, opaque disks 106 may be disposed between the respective jaws of the clamp 110 and the mold members 78 to prevent scratching of the molds and to prevent light leakage through the mold.

An alternate technique for through-the-gasket irradiation is shown in FIG. 8. Referring to FIG. 8, apparatus 200 is shown for carrying out through-the-gasket irradiation. Apparatus 200 includes opposed lamp arrays 202. A lens cell 52 in accordance with FIG. 6 is placed on a turntable 204 disposed between opposed lamp arrays 202. An annular opaque stage 206 is disposed under the front mold member 92 and rests directly on turntable 204. A cap 208 of opaque material is disposed on the back mold member 90. A weight 210 may be disposed upon the back mold member 90 to exert sufficient clamping pressure to prevent premature release.

According to the through-the-gasket irradiation technique, the annular gaskets 80, preferably, are silicone gaskets. Through continued use, however, silicone gaskets become too opaque to allow sufficient ultraviolet light to pass through the gasket to complete the polymerization of the lens forming material. In addition, gaskets having a frosty appearance were observed to yield good quality lenses while gaskets that were clear were observed to yield lenses with optical distortions.

The through-the-gasket irradiation techniques make it quite easy to exert clamping pressure on the mold members 78. Pressure (up to 30 psi) may be applied to the mold members 78, preferably at or about the onset of gelation of the lens forming material, i.e. after the lens forming material is no longer liquid but before it becomes incompressible. At the beginning of the irradiation when the lens forming material is liquid, however, low clamping pressure (such as 2 lb.) may be applied to the mold members 78, which pressure is not so great that the lens forming material leaks between the gasket 80 and the edges of the mold members 78. These techniques also make it easier to direct evenly distributed ultraviolet light through the mold. The gasket 80 serves as a diffuser and prevents sharp intensity gradients that occur when light is passing through the mold and there is an irregularity in the mold. Since the edge of a lens receives a higher intensity of ultraviolet light than the center of the lens, the through-the-gasket technique, therefore, is quite beneficial for the production of negative lenses. Finally, since ultraviolet radiation does not pass through the mold members 78 according to this technique, metal molds which are more flexible than glass molds can be utilized.

The present invention will now be described in more detail with reference to the following examples. These examples are merely illustrative of the present invention and are not intended to be limiting.

EXAMPLE 1

Lenses were produced under various conditions according to the compositions, methods and apparatus of the present invention.

The formulation used to prepare the lenses according to this example included: 17.0% by weight of CR-73, 10.0% by weight of HDDMA, 21.0% by weight of TTEGDA, 32.0% by weight of TRPGDA, 20.0% by weight of TMPTA, 0.0356% by weight of methyl benzoylformate, 0.0095% by weight of Irgacure 184, and 0.16 ppm of Thermoplast Blue 684. The refractive index of this formulation ranged from 1.468 to 1.478. The refractive index of the lenses produced according to this example ranged from 1.507 to 1.511.

The method used to prepare the lenses according to this example was through the mold irradiation with air-cooling.

The gaskets used to prepare the lenses according to this example were GE SE6035 silicone rubber gaskets.

The molds used to prepare the lenses according to this example were made from Schott S-3 glass and had approximately parallel surfaces averaging 4 mm in thickness.

The intensity of ultraviolet light from the top measured at the center of the lens cell ranged from 0.35 $mW/cm^2$ to 0.37 $mW/cm^2$ for all lenses prepared according to this example. The ultraviolet lamps were kept at a temperature between 78 and 98 F.

For all lenses prepared according to this example, the upper light filter included 2 Pyrex glass sheets each frosted on one side with one sheet of tracing paper between them and the lower light filter also included 2 Pyrex glass sheets each frosted on one side with one sheet of tracing paper between them. In some cases the lower light filter included an opaque disc.

The following curing conditions were constant for all lenses prepared according to this example:

ambient temperature—22° C.

cooling air temperature—23.5° C.

exit air flow rate at vent 33—20 $ft^3$/min.

distance from disk to centerline of stage—38 mm.

The results are shown in Table 1 below. The results of this example for positive lenses demonstrate that as the diameter of the opaque disk at the lower light filter is increased: 1) the bottom light intensity is decreased, 2) the flexing of both the front and back molds is increased, 3) the power of the lenses before and after post-cure is reduced or less positive and, 4) the variance from the predicted power is reduced.

The results for negative lenses demonstrate that as the diameter of the opaque disk at the lower light filter is increased: 1) the bottom light intensity is decreased, 2) the flexing of both the front and back molds was essentially identical, 3) the power of the lenses before and after post-cure is increased or more negative, and, 4) the variance from the predicted power is reduced.

TABLE 1

| disc diameter | bottom light intensity in center mW/cm² | flexing front mold | flexing back mold | Power upon demolding | Power after post-cure | Predicted Power | Variance from predicted power |
|---|---|---|---|---|---|---|---|
| 0 | .51 | −.05 | −.09 | +1.82 | +1.92 | +1.80 | +.12 |
| 21 | .44 | −.06 | −.10 | +1.76 | +1.85 | +1.80 | +.05 |
| 39 | .33 | −.09 | −.13 | +1.66 | +1.75 | +1.80 | −.05 |
| 0 | .51 | +.10 | +.04 | −1.80 | −1.91 | −1.98 | +.07 |
| 21 | .44 | +.09 | +.04 | −1.86 | −1.94 | −1.99 | +.05 |
| 39 | .33 | +.07 | +.02 | −1.90 | −1.97 | −1.99 | +.02 |
| 0 | .51 | +.18 | +.06 | −3.72 | −3.94 | −4.02 | +.08 |
| 21 | .44 | +.18 | +.07 | −3.74 | −3.96 | −4.02 | +.06 |
| 39 | .33 | +.14 | +.05 | −3.83 | −4.00 | −4.02 | +.02 |

The results shown in Table 1 clearly demonstrate that the lenses produced according to the present invention are in a stressed condition after ultraviolet light curing. The results also demonstrate that the stressed condition of the lenses can be reduced by an appropriate post-curing heating step. The results also demonstrate that the power of a finished lens produced according to the present invention can be altered by manipulating the intensity of ultraviolet light incident on a lens cell during the curing of a lens.

EXAMPLE 2

As noted above, according to one embodiment of the present invention, the lens cell 52 may be cooled by disposing it in a liquid cooling bath. According to this process a lens was cured under the following conditions: The lens cell was made up of a 5.75 D front mold, a 7.50 D back mold and a silicone rubber gasket. The resultant center thickness was 2.4 mm. The lens molding cavity 82 was filled with lens forming material and the lens cell was placed on a supporting stage in a bath of 85% $H_2O$ with 15% propylene glycol at 0° C. A triangular array of ultraviolet lamps was utilized and the incident light intensity was 2.8 mW/cm² from the top and 1.5 mW/cm² from the bottom. The lens cell was irradiated for 10 minutes and the resultant lens had a measured focusing power of −1.80 D. The lens did not release and exhibited excellent stress patterns. The Shore D hardness was 67.

EXAMPLE 3

As noted above, according to one embodiment of the present invention, the lens forming material can be polymerized by irradiating only through the gasket. According to this technique, a lens cell including a soft silicone rubber gasket configured for creating a −4.25 D lens was suspended in the center of a cylindrical array of Sylvania fluorescent F-15 8T/2052 lamps positioned at a distance from the lens cell to create an average light intensity of approximately 2 mw/cm² on the gasket 80 of the lens cell 52. The sample was irradiated for 40 minutes with 16 pounds of pressure being applied after 13 minutes of irradiation. The pressure was later increased to a total of 21.5 pounds. The lens did not release, gave excellent stress patterns and good optics.

It is thus seen that the methods, apparatus and compositions of the present invention provide several advantages. For example, according to certain embodiments of the present invention a plastic optical lens can be cured in 30 minutes or less. Furthermore, in certain embodiments of the present invention, the lens composition includes monomers having a higher refractive index than conventional monomer materials allowing the production of thinner lenses.

Although not specifically illustrated in the drawings, it is understood that other additional and necessary equipment and structural components will be provided, and that these and all of the components described above are arranged and supported in an appropriate fashion to form a complete and operative system.

It is also understood that variations may be made in the present invention without departing from the spirit and scope of the invention. Of course, other variations can be made by those skilled in the art without departing from the invention as defined by the appended claims.

What is claimed is:

1. A method of making a plastic eyeglass lens, comprising:

placing a polymerizable lens forming material in a mold cavity formed by at least a first mold member having a casting face and a non-casting face, and a second mold member having a casting face and a non-casting face;

directing ultraviolet light toward at least one of the first and second mold members; and directing air from an air distributor towards at least one non-casting face of a mold member, the air distributor comprising an air jet having a substantially cylindrical bore, the bore having a plurality of openings disposed about the circumference thereof, and the air being directed from the openings toward the non-casting face of a mold member.

2. A method of making a plastic eyeglass lens, comprising:

placing a polymerizable lens forming material in a mold cavity formed by at least a first mold member having a casting face and a non-casting face, and a second mold member having a casting face and a non-casting face;

directing ultraviolet light toward at least one of the first and second mold members; and directing air from an air distributor such that air flows from the edges to the center of a non-casting face of the first mold member, and from the edges to the center of a non-casting face of the second mold member.

3. The method of claim 2 wherein the air distributor comprises an air jet having a substantially cylindrical bore, the bore having a plurality of openings disposed about the circumference thereof, and wherein the bore is positioned in relationship to a mold member such that air is directed from the openings to the non-casting face of a mold member.

4. The method of claim 1 wherein the diameter of the openings in the air jet varies about the circumference of the bore.

5. The method of claim 1 wherein the air jet comprises an air inlet and the diameter of the openings is at a minimum adjacent the air inlet, and the diameter of the openings is at a maximum at a point along the circumference of the bore that is opposite the bores having a minimum diameter.

6. The method of claim 1 wherein the air and the ultraviolet light are directed substantially simultaneously to form an eyeglass lens in the mold cavity.

7. The method of claim 2 wherein the air and the ultraviolet light are directed substantially simultaneously to form an eyeglass lens in the mold cavity.

8. The method of claim 1, wherein the mold cavity is substantially cylindrical and the distance between the first mold member and the second mold member varies across a diameter of the mold cavity.

9. The method of claim 2, wherein the mold cavity is substantially cylindrical and the distance between the first mold member and the second mold member varies across a diameter of the mold cavity.

10. The method of claim 1, further comprising filtering the ultraviolet light before the ultraviolet light reaches a mold member.

11. The method of claim 2, further comprising filtering the ultraviolet light before the ultraviolet light reaches a mold member.

12. The method of claim 1, further comprising directing ultraviolet light of varying intensity toward the first and second mold members.

13. The method of claim 2, further comprising directing ultraviolet light of varying intensity toward the first and second mold members.

14. The method of claim 1 wherein the lens forming material cures to form an optical quality eyeglass lens in a time period of less than one hour.

15. The method of claim 2 wherein the lens forming material cures to form an optical quality eyeglass lens in a time period of less than one hour.

16. The method of claim 1, further comprising cooling the air below ambient temperature before directing air toward a non-casting face of a mold member.

17. The method of claim 2, further comprising cooling air below ambient temperature before directing the air toward a non-casting face of a mold member.

18. The method of claim 1, further comprising cooling air to below 20° C. before directing the air toward a non-casting face of a mold member.

19. The method of claim 2, further comprising cooling air to below 20° C. before directing the air toward a non-casting face of a mold member.

20. The method of claim 1 wherein the lens forming material comprises a photoinitiator and at least one polyethylenic-functional monomer containing at least two ethylenically unsaturated groups selected from acrylyl and methacrylyl, and wherein the composition is curable by exposure to ultraviolet light to form a substantially clear eyeglass lens in a time period of less than one hour.

21. The method of claim 2 wherein the lens forming material comprises a photoinitiator and at least one polyethylenic-functional monomer containing at least two ethylenically unsaturated groups selected from acrylyl and methacrylyl, and wherein the composition is curable by exposure to ultraviolet light to form a substantially clear eyeglass lens in a time period of less than one hour.

22. The method of claim 1 wherein the lens forming material comprises a photoinitiator, at least one polyethylenic-functional monomer containing at least two ethylenically unsaturated groups selected from acrylyl and methacrylyl, and an aromatic containing bis(allyl carbonate)functional monomer, and wherein the composition is curable by exposure to ultraviolet light to form a substantially clear eyeglass lens in a time period of less than one hour.

23. The method of claim 2 wherein the lens forming material comprises a photoinitiator, at least one polyethylenic-functional monomer containing at least two ethylenically unsaturated groups selected from acrylyl and methacrylyl, and an aromatic containing bis(allyl carbonate)functional monomer, and wherein the composition is curable by exposure to ultraviolet light to form a substantially clear eyeglass lens in a time period of less than one hour.

24. The method of claim 1, further comprising forming an optical quality eyeglass lens by applying less than ten milliwatts per square centimeter of ultraviolet light to the mold cavity for a time period of less than one hour.

25. The method of claim 2, further comprising forming an optical quality eyeglass lens by applying less than ten milliwatts per square centimeter of ultraviolet light to the mold cavity for a time period of less than one hour.

26. The method of claim 1, further comprising forming a substantially clear eyeglass lens that is greater than 1.5 mm thick, that is substantially free of distortions, cracks, patterns and striations, and that has negligible yellowing and negligible haziness, by applying less than ten milliwatts per square centimeter of ultraviolet light to the mold cavity for a time period of less than one hour.

27. The method of claim 2, further comprising forming a substantially clear eyeglass lens that is greater than 1.5 mm thick, that is substantially free of distortions, cracks, patterns and striations, and that has negligible yellowing and negligible haziness, by applying less than ten milliwatts per square centimeter of ultraviolet light to the mold cavity for a time period of less than one hour.

28. The method of claim 1, further comprising manually removing a lens from the mold cavity.

29. The method of claim 2, further comprising manually removing a lens from the mold cavity.

30. The method of claim 1, further comprising forming an optical quality eyeglass lens by directing ultraviolet light toward the mold cavity for less than 30 minutes.

31. The method of claim 2, further comprising forming an optical quality eyeglass lens by directing ultraviolet light toward the mold cavity for less than 30 minutes.

32. The method of claim 1, further comprising directing a lower intensity of ultraviolet light toward an edge of a mold member versus a center of the mold member.

33. The method of claim 2, further comprising directing a lower intensity of ultraviolet light toward an edge of a mold member versus a center of the mold member.

34. The method of claim 1, further comprising directing a lower intensity of ultraviolet light toward a center of a mold member versus an edge of the mold member.

35. The method of claim 2, further comprising directing a lower intensity of ultraviolet light toward a center of a mold member versus an edge of the mold member.

36. The method of claim 1, further comprising forming an optical quality eyeglass lens by directing ultraviolet light toward the mold cavity for less than 30 minutes, and then heating the formed lens for less than 15 minutes.

37. The method of claim 2, further comprising forming an optical quality eyeglass lens by directing ultraviolet light toward the mold cavity for less than 30 minutes, and then heating the formed lens for less than 15 minutes.

* * * * *